Figure 1:
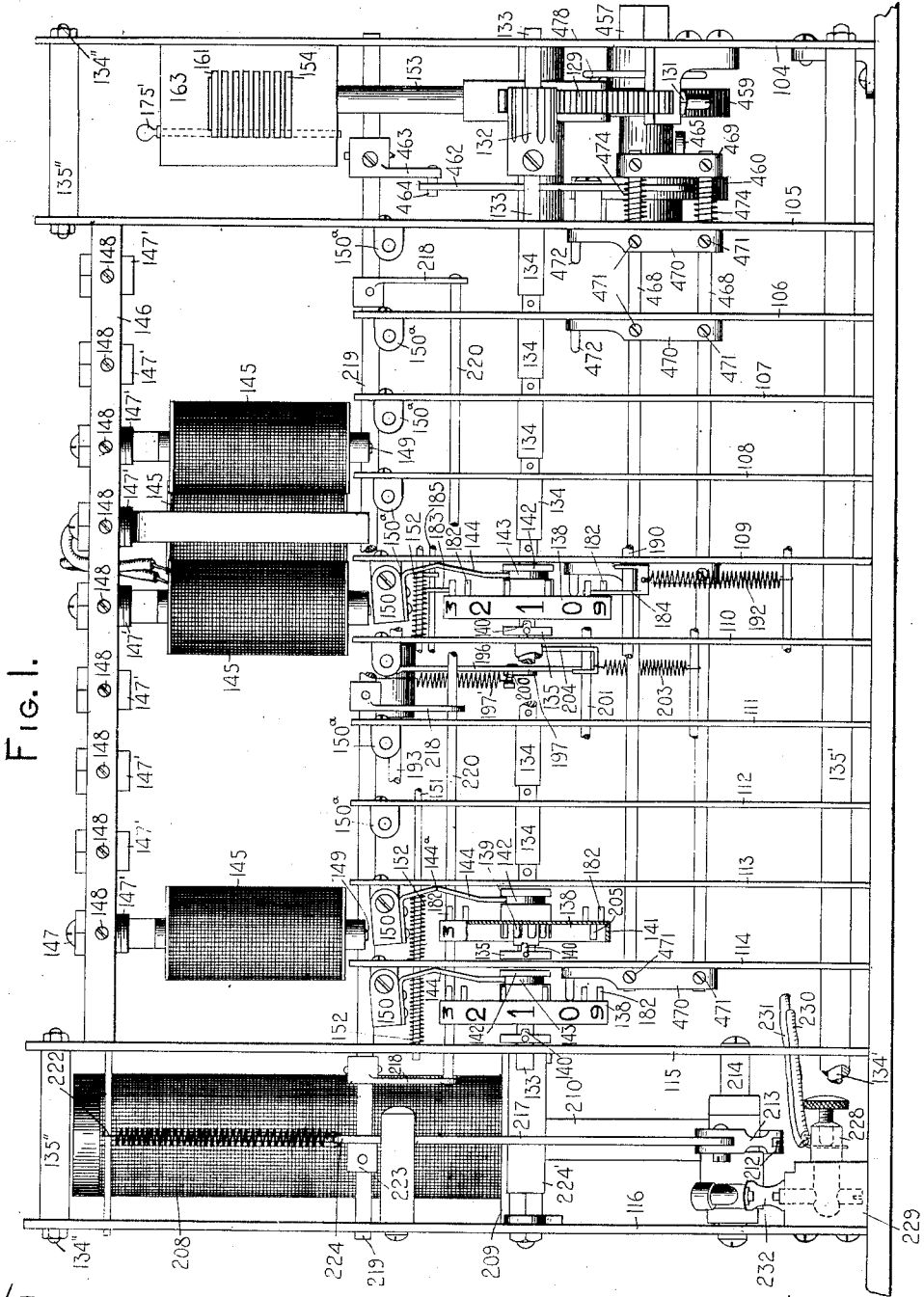

A. H. ELLIS.
ADDING MACHINE, &c.
APPLICATION FILED OCT. 16, 1901.

1,024,397.

Patented Apr. 23, 1912.
15 SHEETS—SHEET 1.

WITNESSES:
E. M. Wells.
K. V. Donovan.

INVENTOR
Albert H. Ellis
by Jacob Felbel
HIS ATTORNEY

A. H. ELLIS.
ADDING MACHINE, &c.
APPLICATION FILED OCT. 16, 1901.

1,024,397.

Patented Apr. 23, 1912.

15 SHEETS—SHEET 3.

WITNESSES.
E. M. Wells.
K. V. Donovan.

INVENTOR
Albert H. Ellis
by Jacob Felbel
HIS ATTORNEY

A. H. ELLIS.
ADDING MACHINE, &c.
APPLICATION FILED OCT. 16, 1901.

1,024,397.

Patented Apr. 23, 1912.

15 SHEETS—SHEET 5.

WITNESSES.
E. M. Wills.
K. V. Donovan.

INVENTOR
Albert H. Ellis
by Jacob Felbel
HIS ATTORNEY

A. H. ELLIS.
ADDING MACHINE, &c.
APPLICATION FILED OCT. 16, 1901.

1,024,397.

Patented Apr. 23, 1912.
15 SHEETS—SHEET 7.

WITNESSES:
E. M. Wells.
K. V. Donovan

INVENTOR
Albert H. Ellis
by Jacob Felbel
HIS ATTORNEY

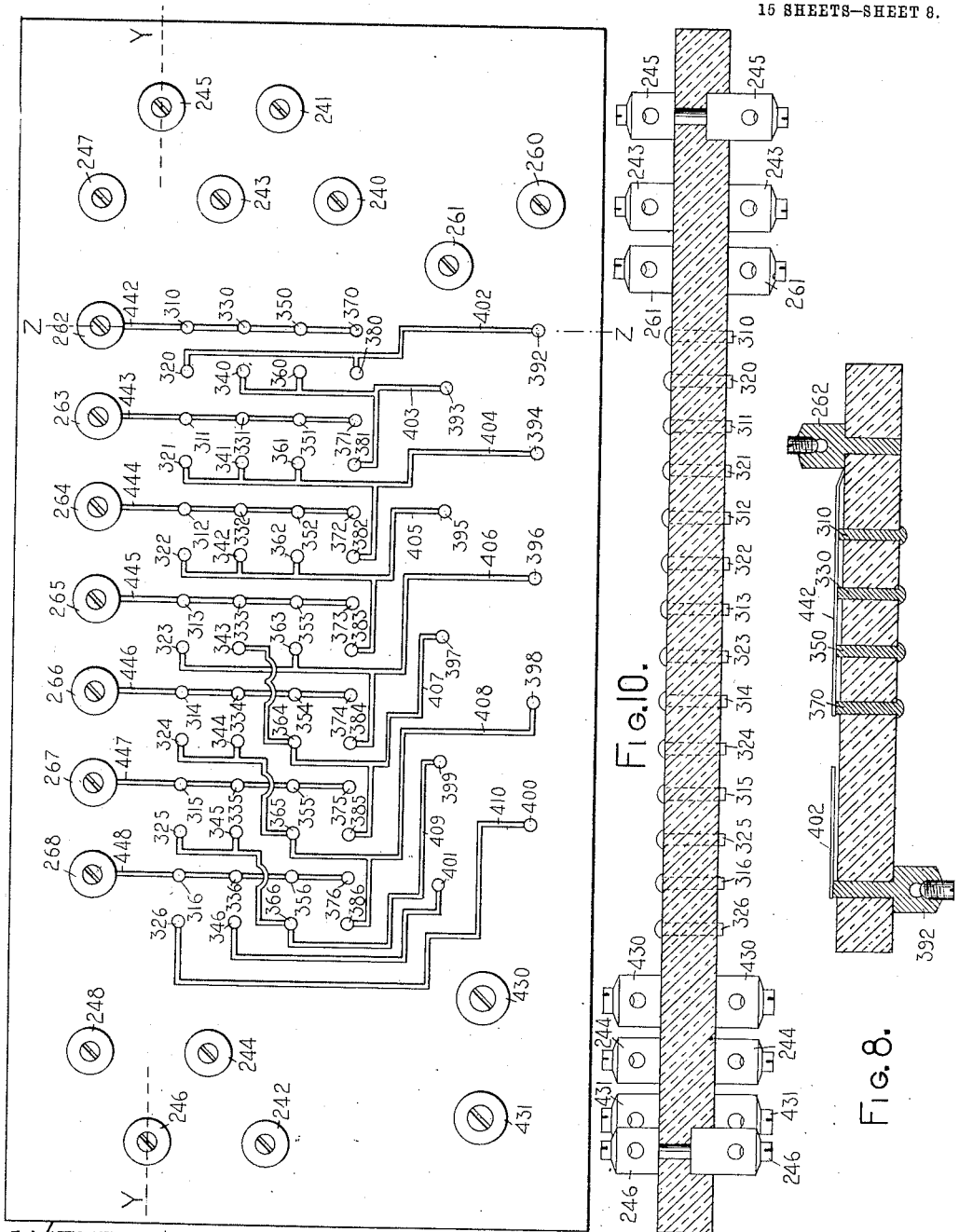

A. H. ELLIS.
ADDING MACHINE, &c.
APPLICATION FILED OCT. 16, 1901.
1,024,397.
Patented Apr. 23, 1912.
15 SHEETS—SHEET 9.
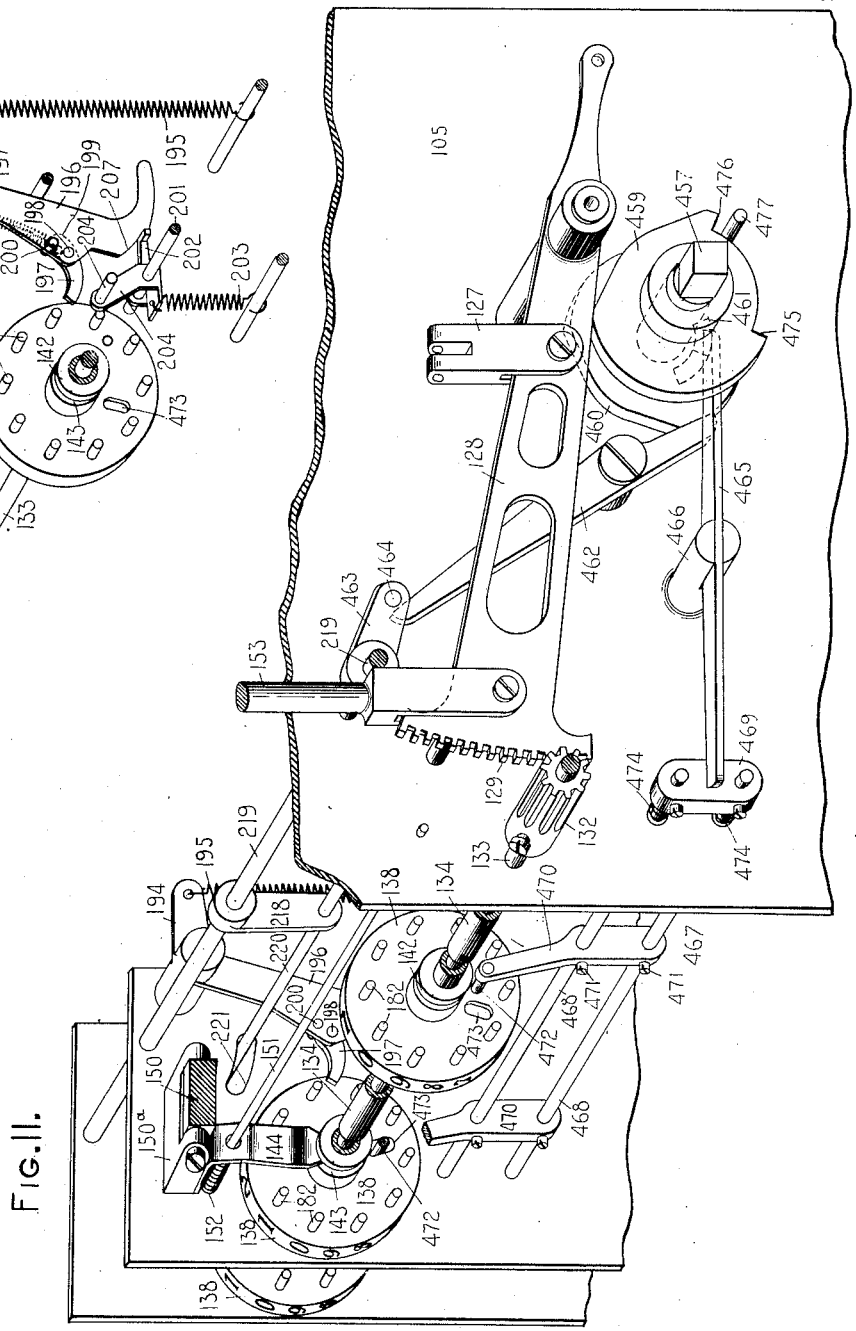
WITNESSES.
E. M. Wells
K. V. Donovan
INVENTOR
Albert H. Ellis
by Jacob Felbel
HIS ATTORNEY A. H. ELLIS.
ADDING MACHINE, &c.
APPLICATION FILED OCT. 16, 1901.
1,024,397.
Patented Apr. 23, 1912.
15 SHEETS—SHEET 10.
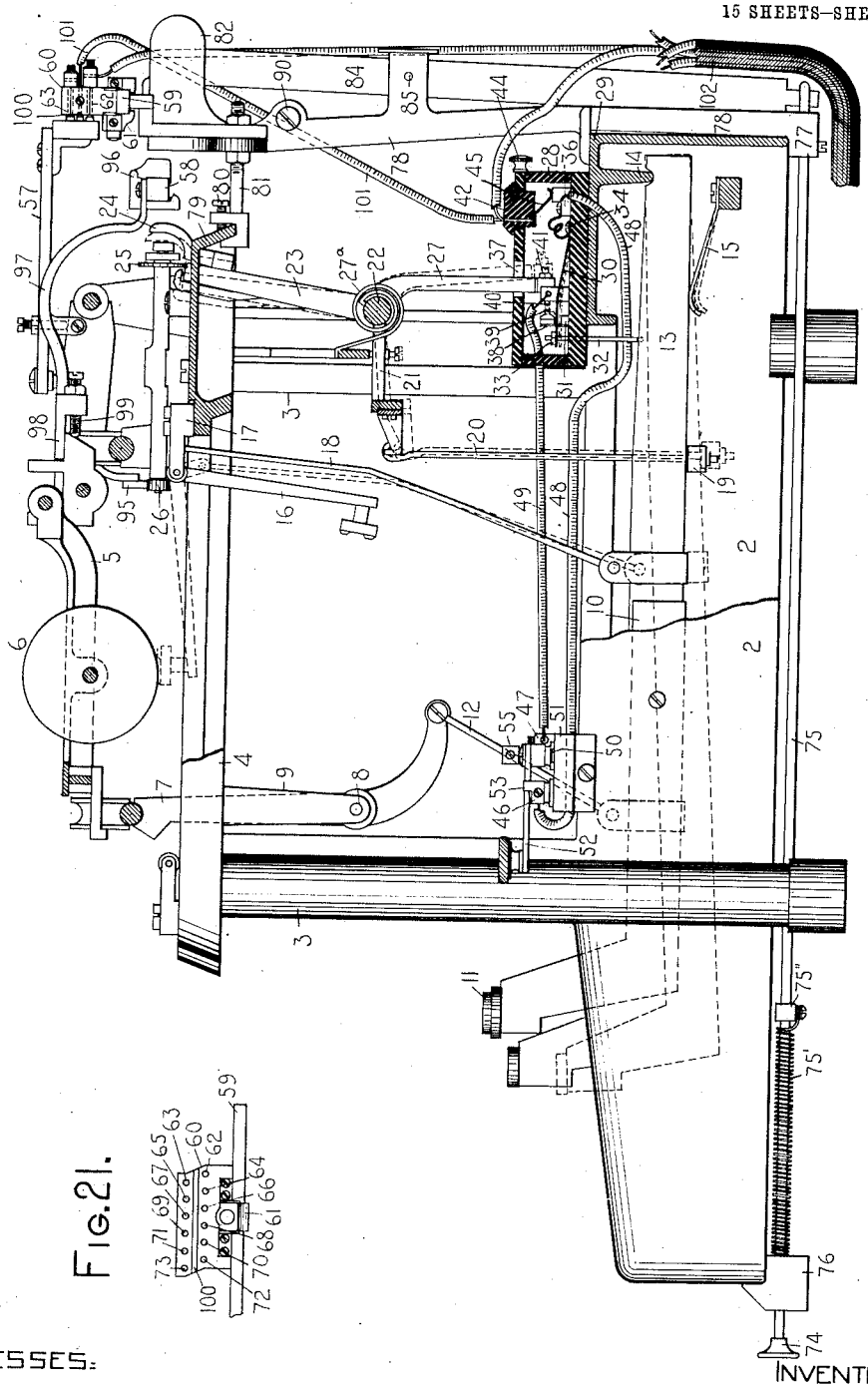
WITNESSES:
E. M. Wells.
K. V. Klonovan.
INVENTOR
Albert H. Ellis
by Jacob Felbel
HIS ATTORNEY

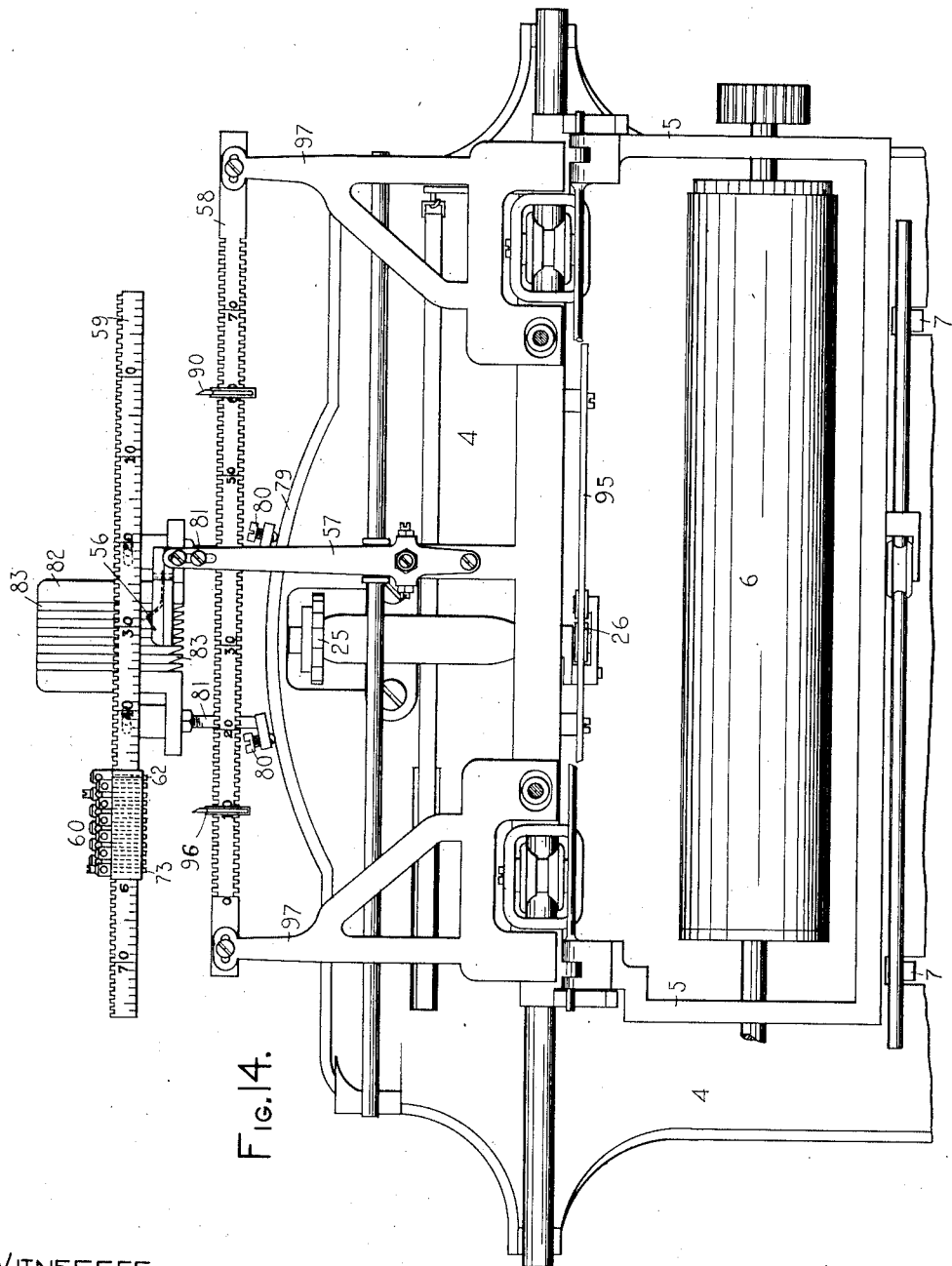

A. H. ELLIS.
ADDING MACHINE, &c.
APPLICATION FILED OCT. 16, 1901.
1,024,397.
Patented Apr. 23, 1912.
15 SHEETS—SHEET 12.
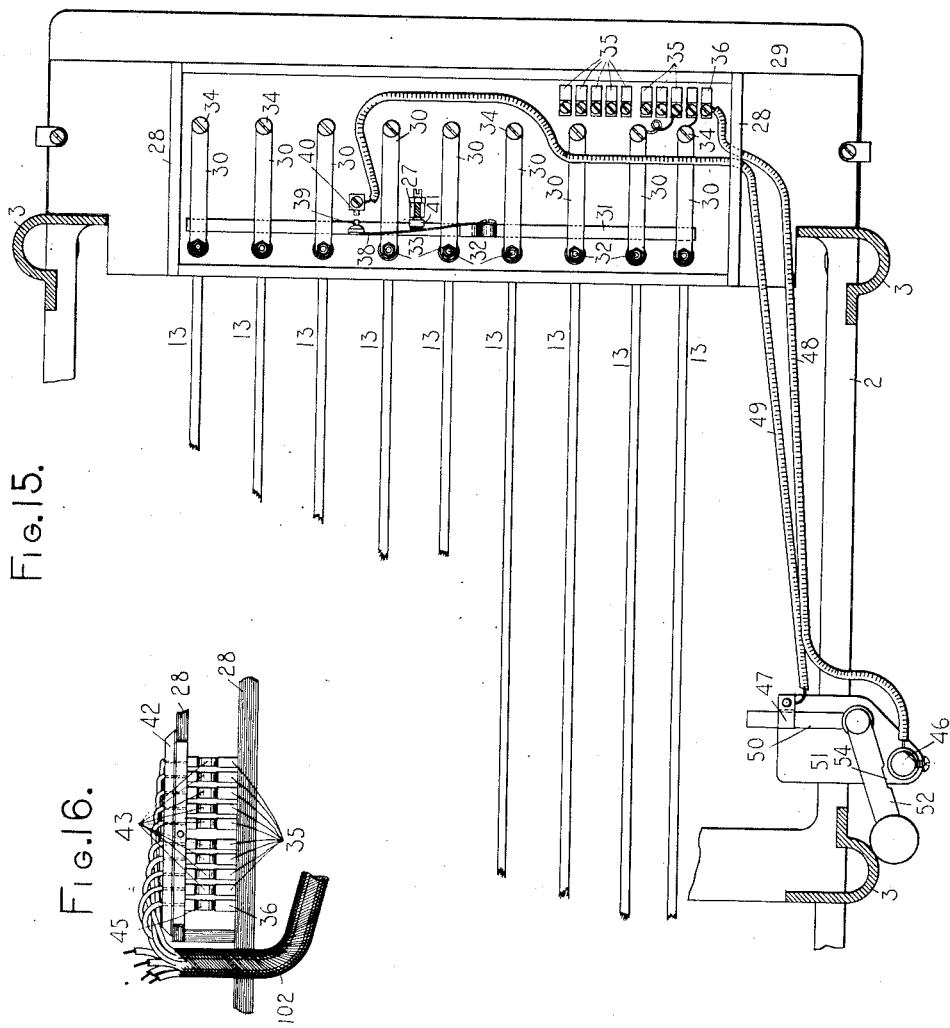
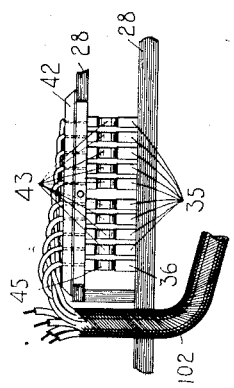
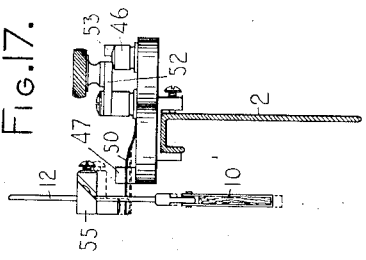
WITNESSES
INVENTOR
Albert H. Ellis
by Jacob Felbel
HIS ATTORNEY A. H. ELLIS.
ADDING MACHINE, &c.
APPLICATION FILED OCT. 16, 1901.

1,024,397.

Patented Apr. 23, 1912.
15 SHEETS—SHEET 13.

WITNESSES:
E. M. Wells.
K. V. Donovan.

INVENTOR
Albert H. Ellis
by Jacob Felbel
HIS ATTORNEY

A. H. ELLIS.
ADDING MACHINE, &c.
APPLICATION FILED OCT. 16, 1901.

1,024,397.

Patented Apr. 23, 1912.
15 SHEETS—SHEET 14.

WITNESSES:
E. M. Wells
K. V. Donovan.

INVENTOR
Albert H. Ellis
by Jacob Felbel
HIS ATTORNEY

A. H. ELLIS.
ADDING MACHINE, &c.
APPLICATION FILED OCT. 16, 1901.

1,024,397.

Patented Apr. 23, 1912.
15 SHEETS—SHEET 15.

WITNESSES
E. M. Wells
K. V. Donovan

INVENTOR
Albert H. Ellis
by Jacob Felbel
HIS ATTORNEY

UNITED STATES PATENT OFFICE.

ALBERT H. ELLIS, OF NEW YORK, N. Y., ASSIGNOR TO WYCKOFF, SEAMANS & BENEDICT, OF ILION, NEW YORK, A CORPORATION OF NEW YORK.

ADDING-MACHINE, &c.

1,024,397.  Specification of Letters Patent.  Patented Apr. 23, 1912.

Application filed October 16, 1901. Serial No. 78,834.

*To all whom it may concern:*

Be it known that I, ALBERT H. ELLIS, citizen of the United States, and resident of the borough of Manhattan, city of New York, in the county of New York and State of New York, have invented certain new and useful Improvements in Adding-Machines, &c., of which the following is a specification.

This invention relates to adding mechanism, and especially to an adding attachment for typewriting machines, and its main object is to provide an improved mechanism of this description in which the work required of the operator is reduced to the minimum and substantially all of the work, except the striking of the keys, accomplished by means of power mechanism set in operation by the actuation of such keys.

While my improved adding mechanism is capable of use either alone or in conjunction with a listing machine having figure keys only, it is especially designed and intended to be used as an adding attachment in connection with an ordinary Remington typewriting machine having both figure keys and letter keys. When an adding mechanism is employed in this manner it is desirable that it be capable of operating at a high rate of speed; that it be adjustable for operation at any part of the line of writing, and that its operation shall involve no increase in the power required to operate the figure keys of the typewriter nor change in mode of operation of the typewriter.

My present invention is in the nature of an improvement upon that shown, described and claimed in my prior application filed November 1, 1899, Serial No. 735,449, in which I have illustrated an adding mechanism capable of use either alone, when controlled by keys or similar devices, or as an attachment in connection with a typewriting machine.

While the same general results are attained with the mechanism illustrated in my prior application, viz., the combination of a group of figure keys and an adding mechanism in such a manner as to enable the operator to strike figures consecutively representing the elements of the sums to be added, and the selection of a different adding wheel for each figure so struck, in order that the elements of such sums may be added by said wheels in the proper order, yet the mechanism by means of which such results are secured in the present case varies in detail construction from that shown in my prior application. It is much more rapid in operation and its parts are so organized as to work with greater certainty and ease of action.

One of the principal features of the mechanism shown in my prior case is an automatic controlling device on the typewriter for transferring the adding operation from one adding wheel to another as successive figure keys are struck by the operator, and in connection therewith I have shown in said prior case how a series of figures may be written with punctuation marks at the proper points between the figures without interfering with the adding operation. These features are retained in the present case, but herein I have provided means for varying the connections between relatively fixed contact points of the controller device and the adding wheels instead of removing and adjusting said contact points as in my prior machine. This change of the connections between the different contact points just referred to and the adding wheels is preferably effected electrically by means of a switchboard and a single multipole switch having groups of contacts so connected as to permit the switch, when shifted, to connect one or more series of such contact points with a series of adding wheels corresponding to the number and order of the figures in the sum to be registered and added. By means of such a switchboard and switch sums may be added either with or without spaces for punctuation marks between the figures at the usual points.

The means which have been provided in the present case for varying the style of punctuation, are an improvement over the means shown in my earlier application hereinbefore specified in two respects. In said earlier application the punctuation was varied by moving the several contact points or pieces of the carriage-controlled circuit controller individually or one at a time. These contacts of my prior application are mounted in a series of slots and any contact can be set in any one of a plurality of said slots and thus made to bring the corresponding adding wheel into operation at different points in the winding, depending on which slot the contact point is put into. By the present invention the change from one style of punctuation to another, is made by means of a single adjustable part which controls all of the electric circuits, as distinguished from making such variations by moving a part of each circuit separately. In the second place, the present construction is an improvement in that the part that is adjusted to vary the style of punctuation, is not the contacts whose action depends on the movement of the carriage, but the adjustment is made at a point in the electrical connections between the contact points and the adding wheels. The adjustment is made in the adding machine itself instead of in the contacts that are mounted on the typewriter. I have claims for both of these features; that is to say, to the provision of a single part, such for example, as a handle or multi-pole switch, that can be set to any one of a plurality of positions, and when said part is set to one position the machine is arranged for one style of punctuation and when said part is set to another position the machine is arranged for another style of punctuation, this single part controlling a plurality of wheels; and I also have claims to the feature of varying the connections between the controller contacts and the adding wheels, as distinguished from varying the controller contacts themselves. The earlier case is intended to cover broadly any means for varying the spacing of the printing.

In every adding mechanism a carrying device for carrying forward from one order to another the excess not registrable by any given wheel is a necessary element, and in carrying devices as generally heretofore constructed it has been customary to impose upon the adding wheel from which the excess is to be transferred the work of operating the wheel representing the next higher order, and this, of course, necessitates the application of more power to the lower wheel when such higher wheel is to be turned. For the purpose of avoiding this, I make use in the present case, of a carrying device capable of carrying from one order to the next without imposing upon the first of such two wheels the duty of actuating the second. In my present machine I employ a spring-actuated carrying device which normally is latched under tension by a detent mechanism and is automatically tripped or released by the wheel of the lower order at the proper time for carrying to a wheel of a higher order, said carrying device through the tension of its spring turning said wheel of the higher order. For the purpose of resetting or restoring the said carrying device to its normal position and relatching it therein, I employ means operated by an entirely independent power from that used for effecting a rotative movement of the wheels and also from that employed to actuate the carrying device when it makes its operative stroke, thus enabling each wheel to be turned with the minimum of power and at the maximum of speed. When a carrying device of this style is used in connection with a key-operated machine, and especially a typewriter of any well-known construction, it will be seen that the keys may be employed as the means for controlling the adding movements of the wheels without actually performing the work of turning the same, and that this turning also may be produced from a source of power other than the finger movement of the operator. In such a case it will be evident that an adding mechanism results in which both the units adding movements and the carrying movements of the wheels are effected by power independent of the power which operates the keys, and also that the power for turning the wheels to impart the ordinary digit adding movements thereto is independent of that for accomplishing the carrying movement.

In order to produce the units adding movements of the adding mechanism, I prefer to employ a mechanism having a plurality or series of adding wheels normally disconnected from, but capable of being quickly connected to, a common actuator or shaft having a turning movement which may vary according as the number to be registered is one or another of the nine digits, the movement of the shaft being therefore one, nine, or any intermediate number of feed units corresponding to the figure struck. Each of these wheels is preferably associated with the rotary actuator in such a manner as to be instantly connected thereto at the beginning of an adding movement, and as quickly released therefrom at the end thereof, each wheel having in the present case one member of a clutch and the actuator having the other or complementary members of all of such clutches, suitable selecting means controlled by the respective keys, and embodying the automatic controlling device hereinbefore referred to, being employed to determine which one of the adding wheels shall be coupled with said actuator when any key is struck, it being obvious that owing to the transfer of the control of the adding operation from one adding wheel to another that particular adding wheel which represents the order of the number struck will always be the one selected. Hence it will be seen that while the controlling device referred to may be employed as the means for transferring the control of the adding operation from one order to another, and therefore from one adding wheel representing one order to another wheel representing another order, the keys themselves may serve as the means for indicating the extent of movement of the common actuator, and therefore of any one of the wheels of the series regardless of what order it represents. The extent of rotation of this common actuator is determined in a manner somewhat analogous to that illustrated in my said prior application, but in this case instead of employing a series of stop devices in connection with a series of independent wheel drivers, the series of stop devices in the present machine co-acts with a single rotary actuator variably to arrest the movements thereof. Furthermore I provide means for preventing back-lash of each adding wheel and for returning each adding wheel to normal position on an over-rotation thereof.

My improved controlling device for transferring the control of the adding operation from one order to another, as digits of different orders are selected one after another in writing any given number, is especially designed and intended in the present construction for coöperation with a suitable tabulating device, in order to permit the carriage to be shifted quickly to any desired tabulating point and the controlling device brought into action at such point by the engagement of one member of the controller moving with the carriage with a complementary member of such controller at an adjacent relatively fixed point. Hence, when a tabulating device and my improved controlling device having a plurality of controlling points or contacts are combined, any desired matter may be written in a line before reaching the tabulating point and the carriage then shifted quickly to such tabulating point by operating the proper tabulating push rod or key, whereupon the controlling device, which up to that time remained out of action, will be brought into operative condition by the engagement of the controller member or contact arm on the carriage with the corresponding point or contact of the series usually mounted on the framework.

I have had various other objects in view in the construction of my improved adding machine and its combination with a typewriting machine, all of which will hereinafter appear in connection with the description of said machines and their modes of operation, but it may be remarked here that I have provided novel means for resetting all of the adding wheels to their zero position; and means whereby the electrical connections between the typewriting machine and the adding machine may be conveniently attached or detached according as to whether the adding machine is to be used or not.

Figure 2:
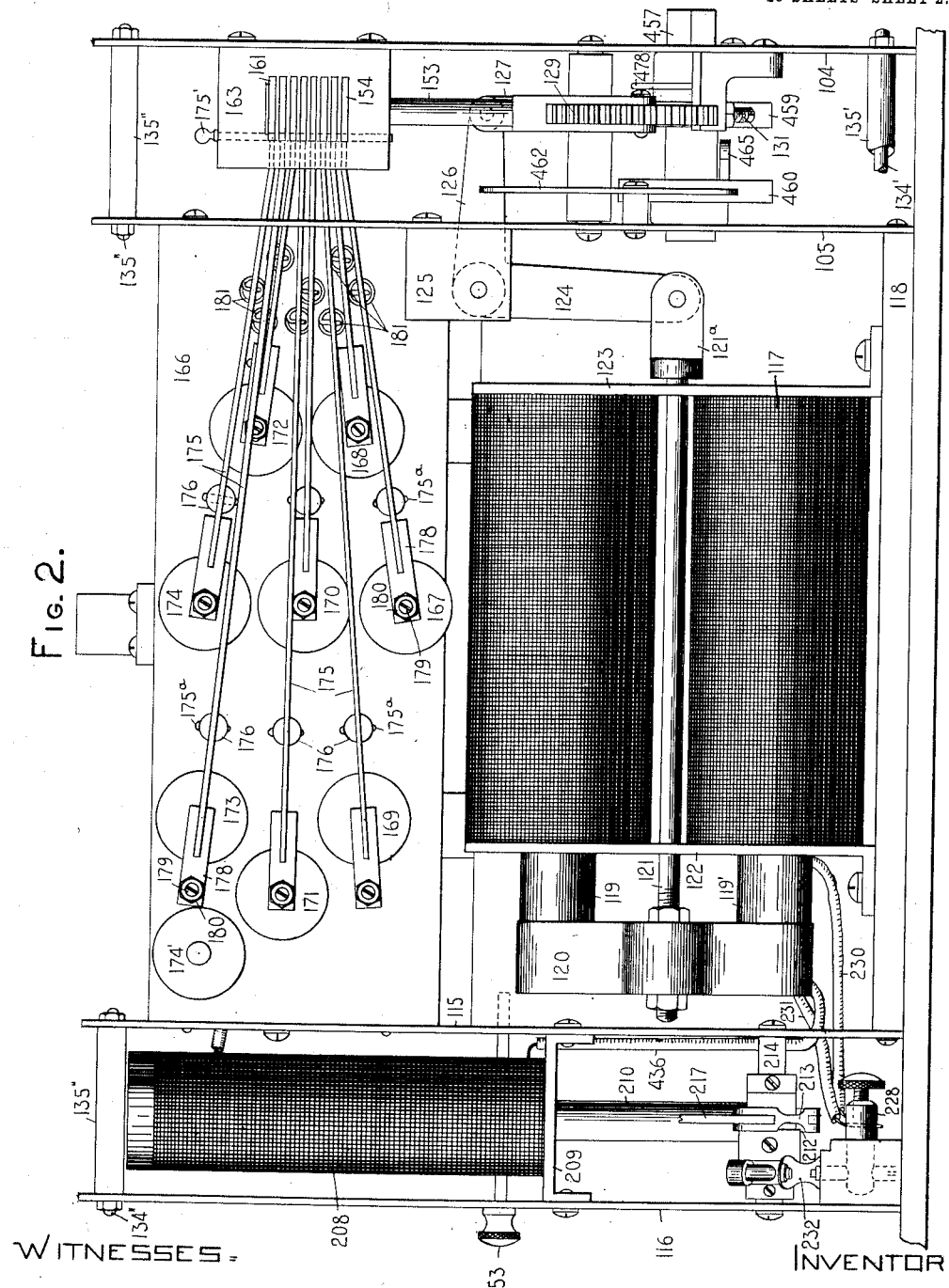
Figure 3:
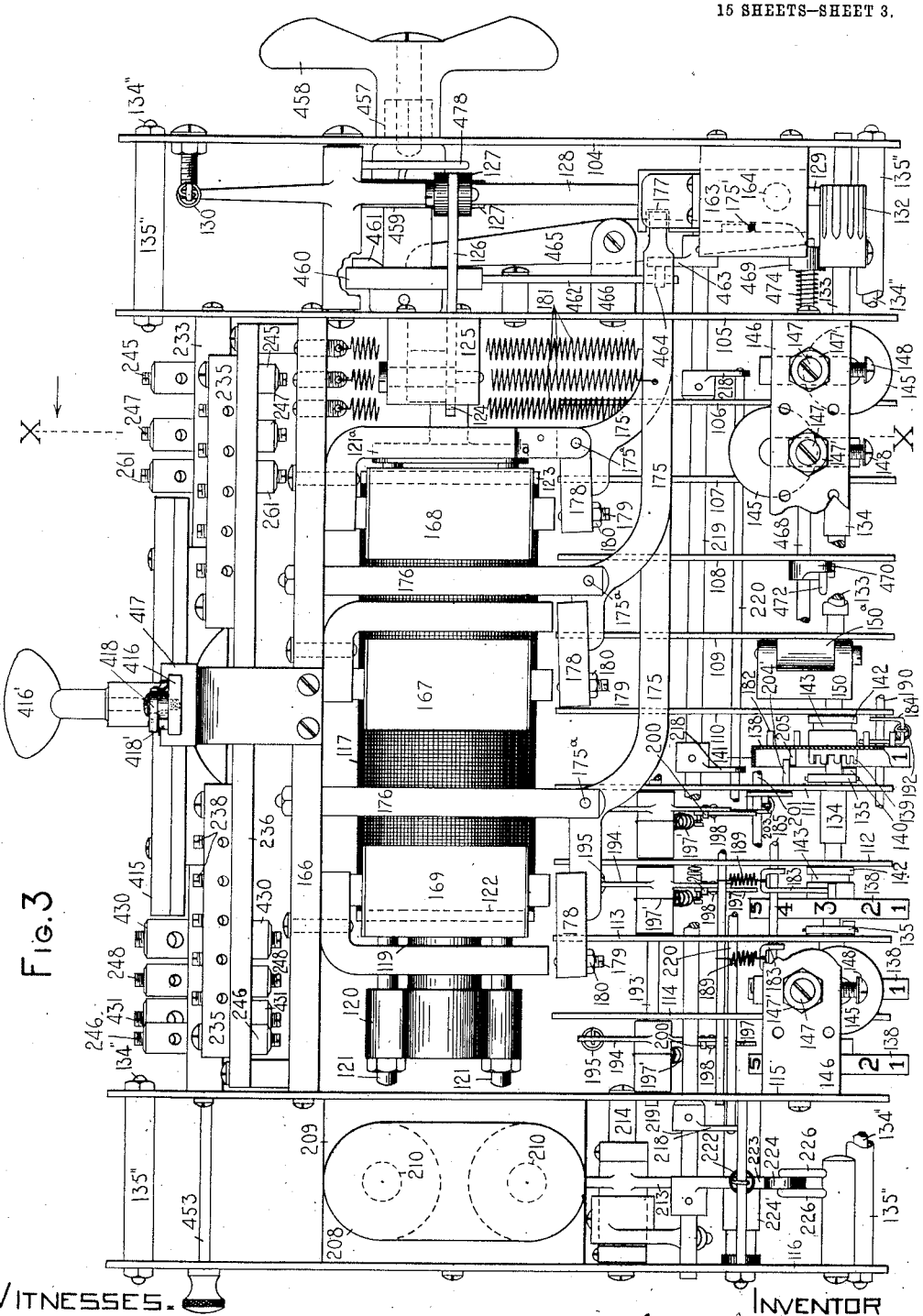
Figure 4:
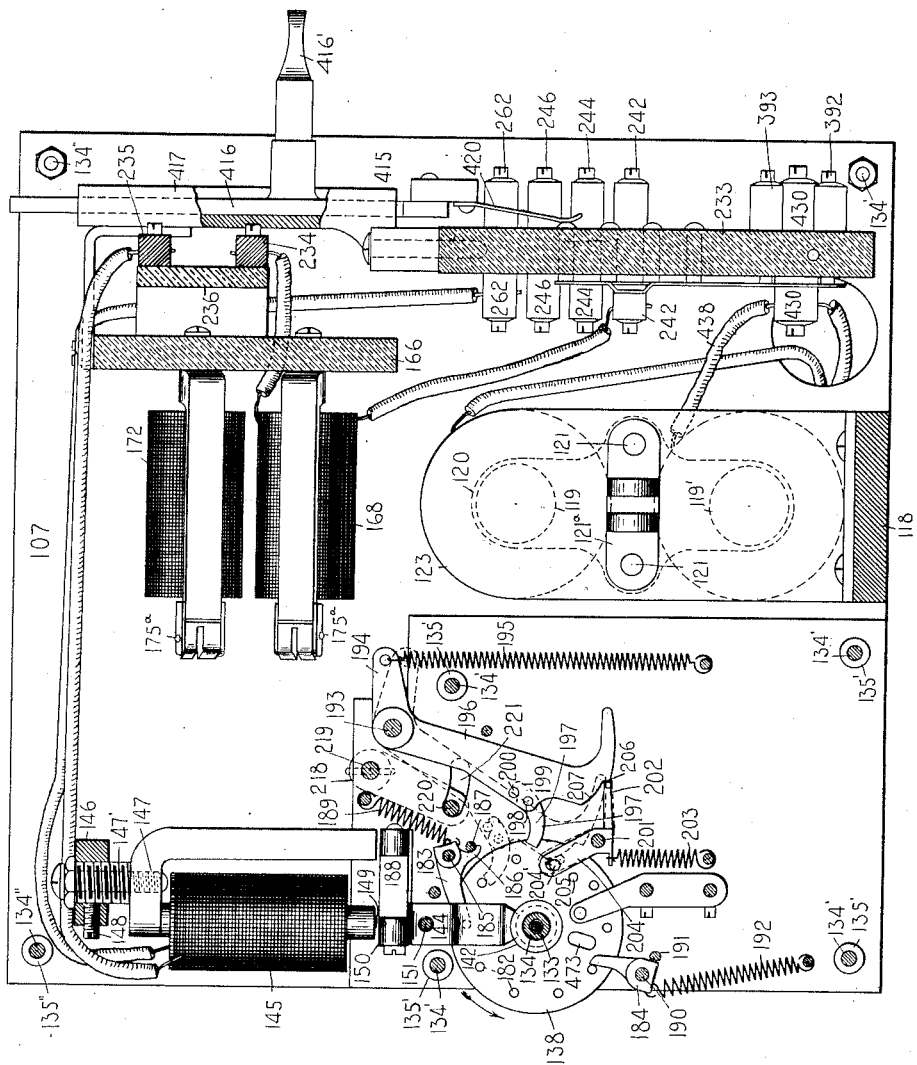
Figure 5:
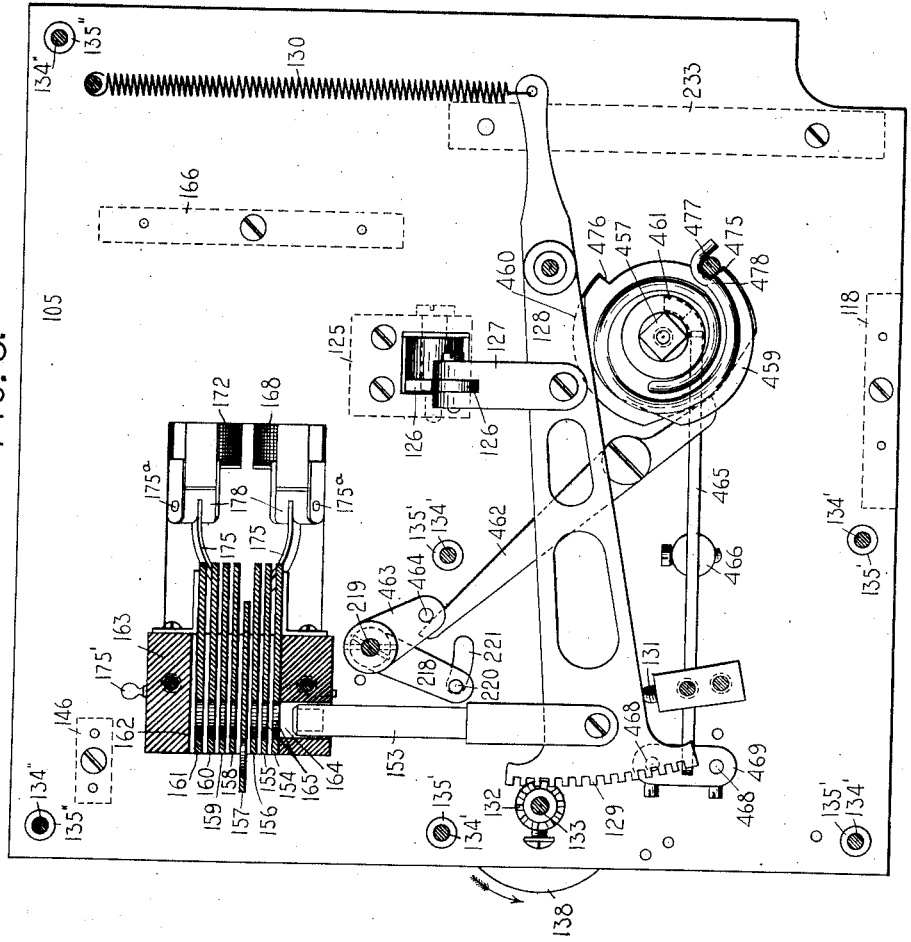
Figure 6:
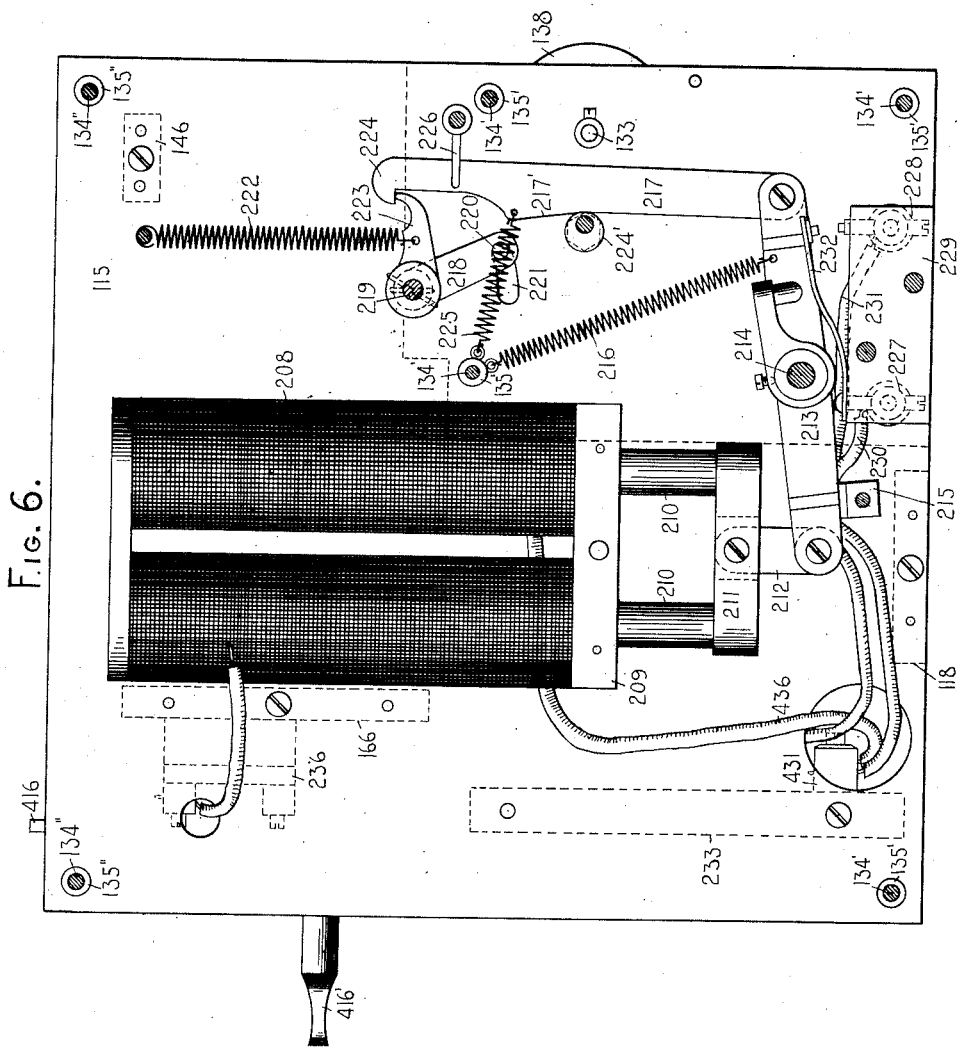
Figure 7:
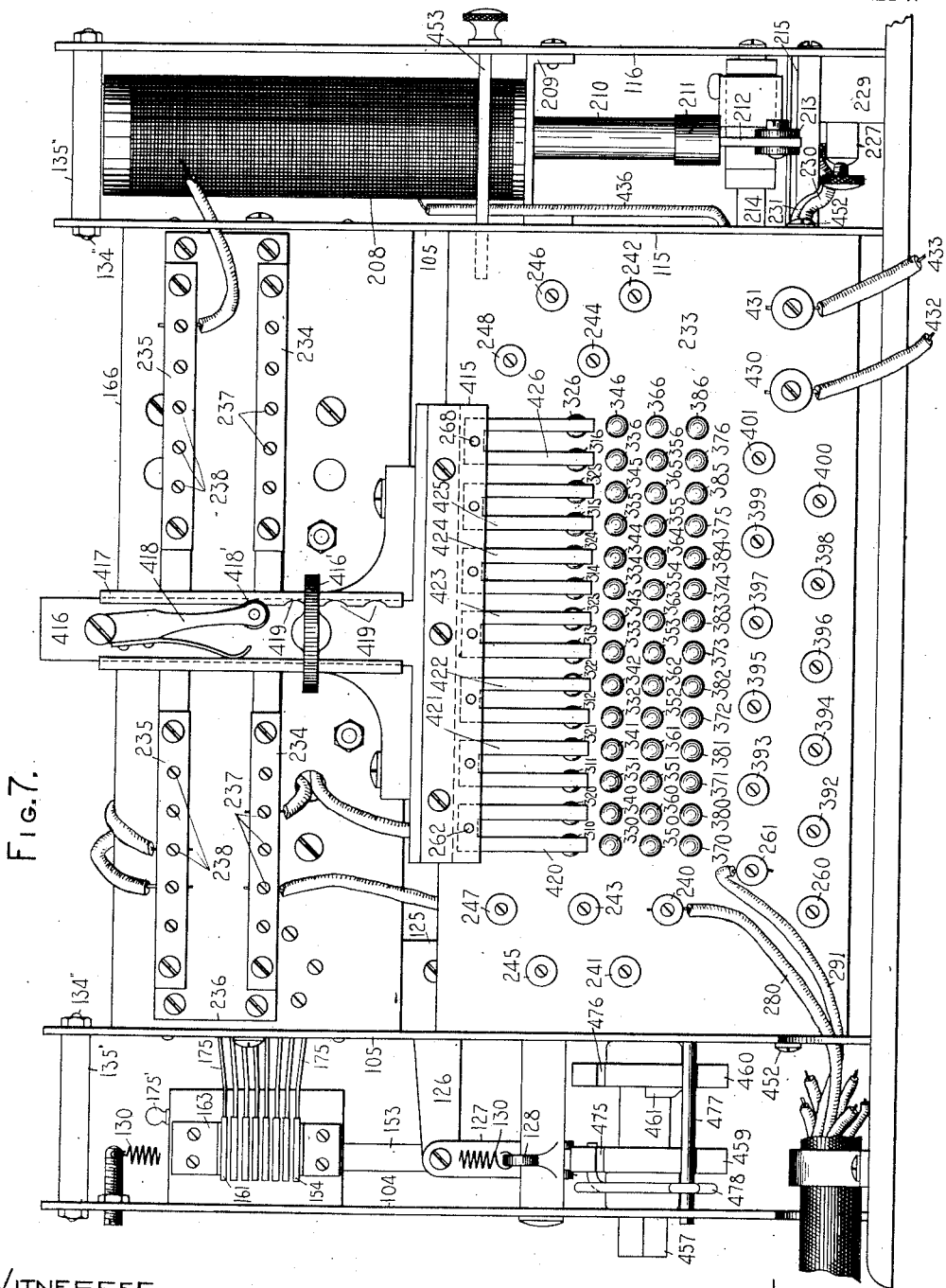
Figure 18:
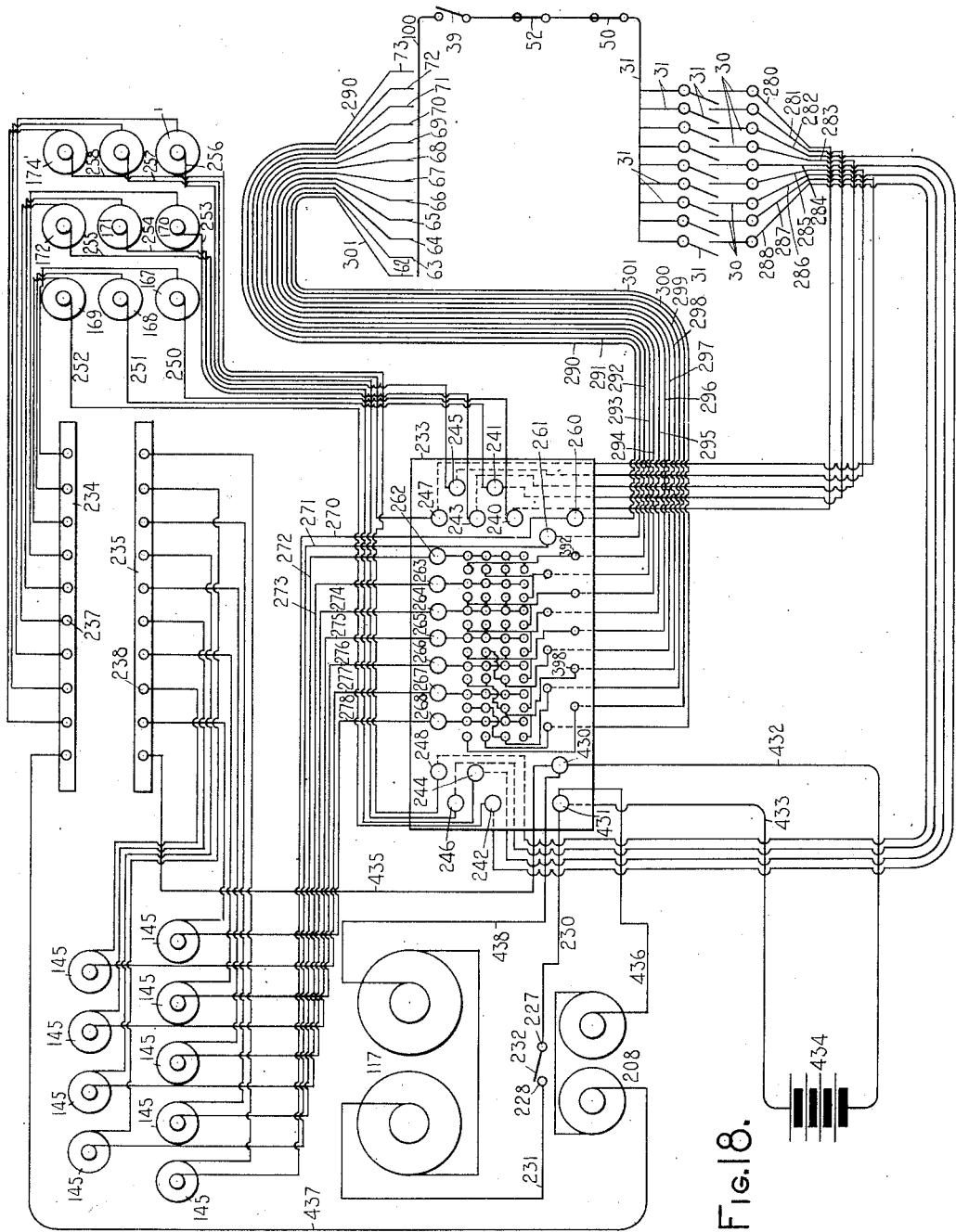
Figure 19:
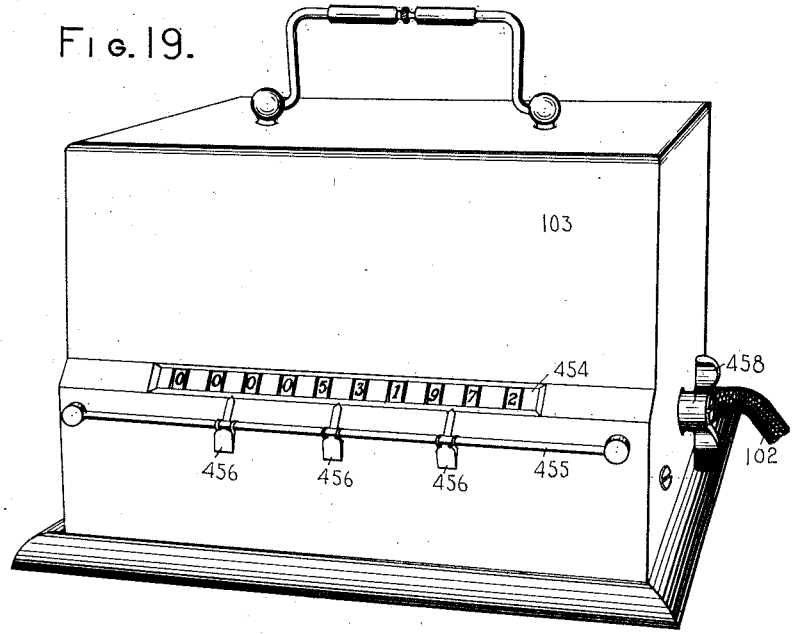
Figure 20:
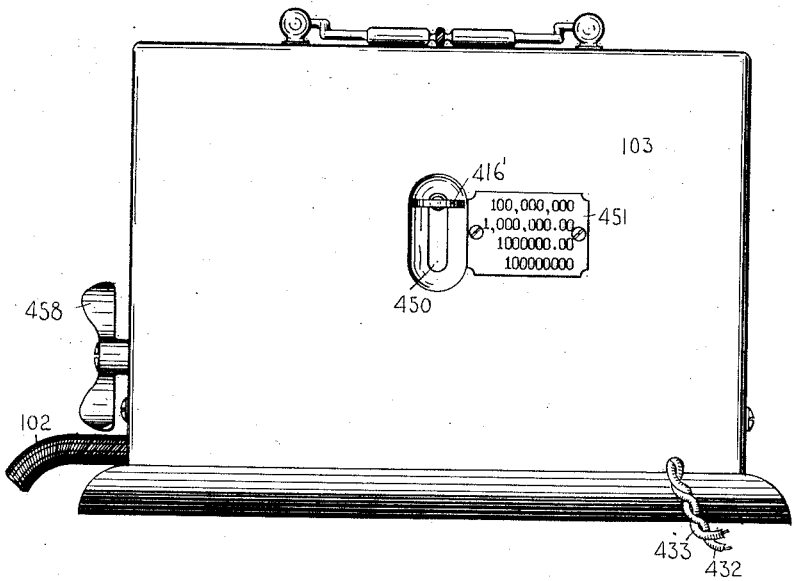

Figure 1 is a front elevation of an adding mechanism embodying my invention with the outside casing removed and parts removed and broken away to show the construction clearly. Fig. 2 is a front elevation of the same with some of the parts removed, and shows the main solenoid for turning the wheel-actuating shaft together with the parts coöperating with such solenoid. Fig. 3 is a plan of the same with the casing and other parts removed or broken away, and illustrates generally the manner in which the wheel-selecting devices, the stroke-determining devices, the solenoid for the wheel-actuating shaft, and various other parts are organized with respect to one another. Fig. 4 is a sectional end elevation of the same, the section being taken in line X—X of Fig. 3, looking from the right, and illustrates in detail a carrying device and coöperating parts and also the switch-board and the connections of the electro-magnets and the main solenoid thereto. Fig. 5 is a sectional end elevation of the same, looking from the right in Fig. 3 with the end partition removed, and shows the manner in which the wheel-actuating shaft is rotated different distances by the operating mechanism controlled by the various stop-arms. Fig. 6 is a sectional end elevation of the same, looking from the left in Fig. 3, with the last partition removed, and shows the parts controlling the movements of the carrying device and also the relay for throwing the main solenoid into and out of action. Fig. 7 is a rear elevation of the adding mechanism with the casing removed, and illustrates a switch-board and connections for governing the circuits to the various electrically-operated parts. Fig. 8 is a cross section of said switchboard on line $z, z$ of Fig. 9. Fig. 9 is a front elevation of said switch-board, showing the manner in which the different groups of terminals are connected. Fig. 10 is a longitudinal section of said switch-board, the section being taken in line Y—Y of Fig. 9. Fig. 11 is an isometric view, showing the resetting mechanism and some of the wheels co-acting therewith. Fig. 12 is an isometric detail, illustrating a carrying device co-acting with one of the adding wheels. Fig. 13 is a sectional end elevation of a double-case typewriting machine adapted to co-act with, and control the operation of, the adding mechanism and illustrates various electrical circuits and circuit-controlling devices carried by the typewriter. Fig. 14 is an enlarged plan of the major portion of said typewriter and illustrates particularly the manner in which the automatic electrical controller coöperates with the tabulating device and with the column gage of the typewriter. Fig. 15 is a sectional plan of the rear portion of the base of the typewriting machine and illustrates a contact box and contacts or terminals controlled by the figure keys, together with circuit-breakers or switches controlled by the shift device and shift-key of the typewriter. Fig. 16 is a detail illustrating in rear elevation a detachable insulating plug for connecting the typewriting machine electrically with the adding mechanism. Fig. 17 is a detail illustrating in front elevation circuit-controllers governed respectively by a hand switch and by the shift-key of the typewriter for electrically disconnecting the writing machine and the adding mechanism when upper-case characters are to be written. Fig. 18 is a diagram of the various electric circuits and all of the parts included therein. Fig. 19 is a perspective view of the adding mechanism inclosed in a suitable case having a sight opening with shiftable pointers or punctuation-indicators settable to proper points between different adding wheels. Fig. 20 is a rear elevation of the same, showing an index plate and indicator for setting the multipole switch to any one of its different positions. Fig. 21 is a detail illustrating in front elevation a contact block forming the principal member of the electrical controller for transferring the registering operation from one adding wheel to another; and Fig. 22 is a side elevation, partly in section, of a tabulating device associated with coöperating parts of a typewriting machine.

Figure 22:
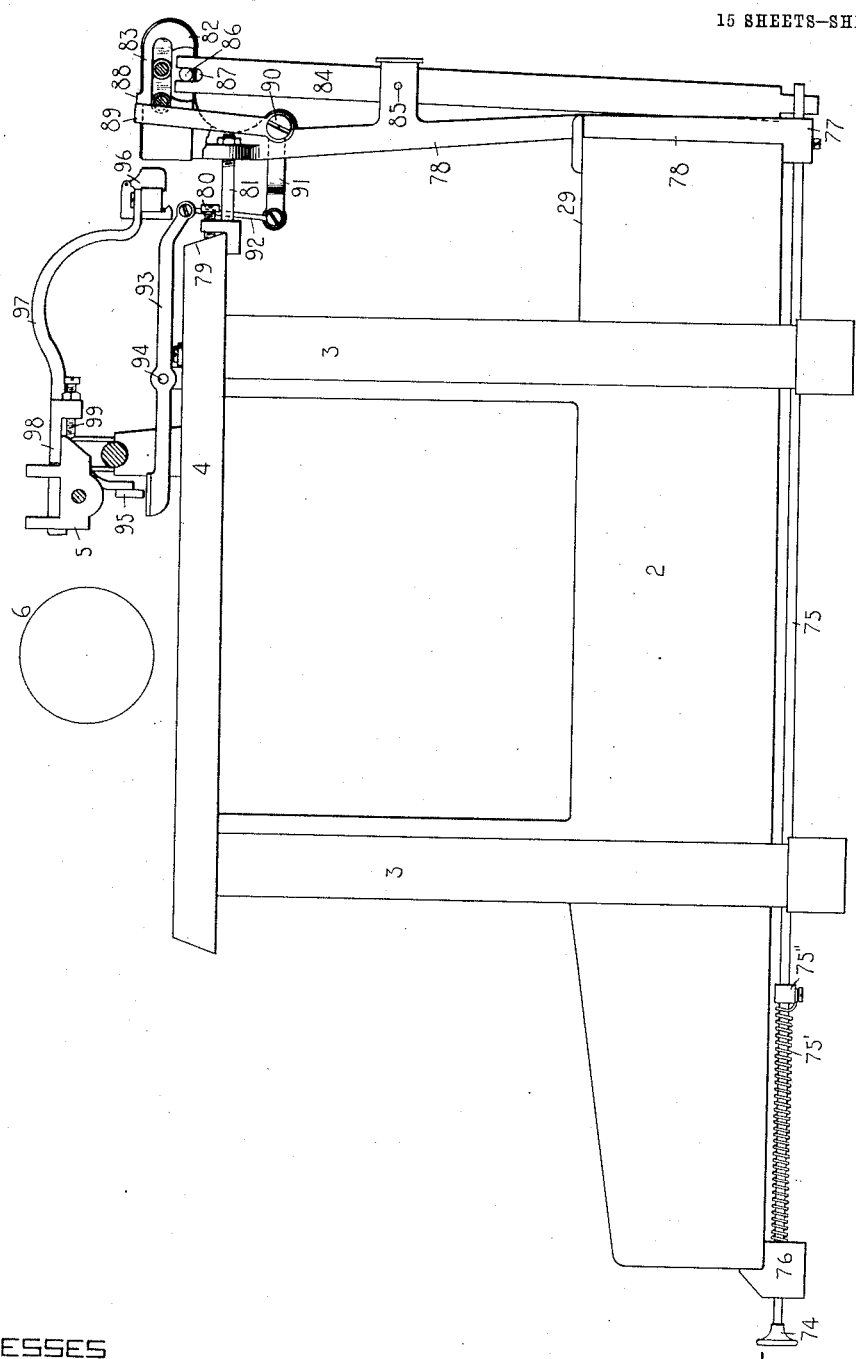

Referring first to Figs. 13 to 17 inclusive, and to Figs. 21 and 22, I have shown a Remington No. 6 typewriting machine with suitable additions for the purpose of adapting it for use in connection with an adding mechanism embodying my invention, although of course it should be understood that said adding mechanism may be controlled merely by keys without the interposition of typewriting mechanism between them and such adding mechanism. In this embodiment of my invention the base of the typewriter is designated by 2, and has the usual posts 3 rising therefrom and supporting a top plate 4, on which is mounted a carriage 5 supporting a platen 6, the carriage with its platen being shiftable in the usual manner by means of a lever 7 pivoted at 8 in hangers 9 depending from the top-plate 4 and connected at its lower end in some suitable manner to a shift-lever 10 to which a shift-key 11 is attached, the connection in this case being effected by means of a short rod or link 12. The ordinary key levers of the machine for letters, figures, etc., are designated by 13 and are pivoted in the usual manner at 14 and held up in their normal positions by springs 15, all of said keys serving to operate corresponding double-case type-bars 16 pivoted in hangers 17 on the top plate and joined by connecting-rods 18 to the key levers 13. These key levers also control the operation of a universal-bar, such as 19, suspended by means of connecting-rods or hooks 20 from arms 21 of a rock-frame carried by a rock-shaft 22. The upper arm 23 of said rocker frame controls one member 24 of an escapement, the scape-wheel 25 of which transmits its movements in the usual manner through a pinion 26 to the usual rack on the carriage 5 to impart a step-by-step movement to said carriage. The rocker-frame just described has another arm 27 depending therefrom for a purpose which will be hereinafter stated. The adding mechanism in this construction will be controlled by the figure keys 13 of the typewriting machine, these keys serving to operate electrical contact devices by means of which corresponding circuits to the adding mechanism are made or broken to control the starting and stopping of each separate adding movement. The contact devices, which are controlled by the keys, are preferably mounted in a box 28 of insulating material, which may be secured to the back shelf 29 of the typewriter in such a manner as to be readily removable therefrom. This contact box is so positioned as to span the figure-key-levers 13 and has nine contact-arms or springs 30 therein, one for each figure-key-lever. These contact springs have a downward tension and are located in the vertical planes of their respective key-levers. Each of these contact springs is associated with its key-lever in such a manner as to be pivotally adjustable relatively thereto and also adjustable with respect to a coöperating contact, which in this case is a contact bar 31 common to all of the contact-springs 30. I prefer to effect the adjustment of each of these contact-springs by means of a threaded rod 32 having the lower end resting on its proper key-lever while the upper end passes through a threaded nut-like portion secured to the free end of the contact-spring 30, the rod 32 by its position regulating the distance which the spring 30 will have to move down before it makes contact with the bar 31. In this construction the key levers do not force the contact springs 30 into engagement with the bar 31, but instead release the contact springs by withdrawing or lowering the supports (the key levers) which in their normal positions through the rods 32, hold the springs against their tension and away from the bar 31, so that when a key lever is depressed, the tension of one of the springs is relieved and it makes contact with said bar 31. Hence the depression of a figure-key lever involves no extra work of any kind, there being no additional resistance opposed to its movement. Each of the contact-springs 30 is connected by means of a binding-screw 34 to a corresponding contact terminal 35, nine of such terminals being shown herein, one for each arm 30. An additional terminal 36, similar to those shown at 35, is also illustrated for the purpose of making connection with the return circuit, (see Fig. 15), this being done in the present case through a switch device (hereinafter described) controlled by the shift-key of the typewriter and operative to break the circuit whenever the carriage is shifted to the upper-case position, it being understood that the figure keys ordinarily occupy the lower-case position.

In order to prevent sparking between the contact-springs 30 and the bar 31, I prefer to arrange in the circuit, including the common contact bar 31, an independent spring 38 having a contact point 39 that is adapted at certain times to bear against a fixed contact 40, likewise included in said circuit. This contact spring 38 is controlled through the universal bar 19 and rocker arm 27. This rocker-arm passes through an opening 37 in the cover of the contact box 28 and at its lower end oscillates back and forth within said box. The spring contact 38 is secured to the common contact bar and is normally flexed or held under restraint by the pressure of the arm 27 under the tension of the rocker spring 27ª, the lower end of said arm being preferably provided with a screw 41 whose insulated point bears against the side of said spring 38 to keep the contacts 39 and 40 normally separated. When, however, any key is struck the arm 27 moves rearwardly and the points 39 and 40 are permitted to come into contact so as to close the circuit at this locality. The parts are so disposed in time as that a spring 30 makes contact with the common contact bar 31 just before the contacts 39 and 40 touch and thus complete the circuit, and on the return of the parts to normal position the contacts 39 and 40 separate slightly in advance of the contacts 30 and 31. Thus it will be seen that inasmuch as the circuit is broken before the contacts 30 and 31 are parted, there can be no sparking at these points.

In the top of the contact box 28 there is an opening for the reception of a detachable insulating plug 42 (see Figs. 13 and 16) from which depend contacts, preferably spring-arms 43 at least equal in number to the number of figure keys and their contacts, these spring-arms 43 making contact with the circuit-terminals 35 when the typewriting machine and the adding mechanism are connected. The adding mechanism may be entirely disconnected from the typewriting machine and set aside, if desired, by removing the plug 42 from the contact box 28, this being accomplished in the present case by removing a locking pin 44, which passes through registering openings in the contact box and said detachable insulating plug when the plug is in its working position and by removing the adding wheel selecting controller hereinafter referred to.

In addition to the spring-arms 43 there is another arm 45, which may be similar in every respect to those shown at 43 but which will contact with the terminal 36. These two contacts 45 and 36 are connected in series in the main circuit and whenever the circuit through them is broken of course the adding mechanism and the writing machine will be electrically disconnected. Hence if a circuit from the contact 36 through the common contact bar 31 and contacts 39 and 40 is broken at another point, it is evident that said mechanisms will be electrically disconnected regardless of whether the break controlled by the universal-bar-operated contact is closed or whether that controlled by the key-operated contact is closed. Such an additional break is the preferred means employed by me for disconnecting said mechanisms electrically when the carriage is shifted from one case position representing the figure keys to another or upper-case position. This extra break in the circuit may be governed by a hand-switch or by a contact controlled by the shift-key 11 or by both.

In the construction shown in Figs. 13, 15 and 17, two electrical conductors lead respectively from the terminals 36 and 40 to another pair of terminals 46 and 47 and are preferably insulated wires 48 and 49. The connection between the terminals 46 and 47 may be governed by a duplex circuit-controller consisting of a contact-arm 50 secured to a suitable support 51 and a hand switch 52 for operating the arm 50. The two arms 50 and 52 are intended to come into contact respectively with the terminals 47 and 46, and in order to close the circuit between said terminals it is necessary that both of said arms be in engagement with their terminals. The terminal or post 46 has a projection 53 forming a stop for the hand switch 52 and the latter is cut away at 54 to hold it securely in place. The arm 50 is normally in engagement with the under side of its contact 47, but it may be depressed by the shift-key and the circuit broken at such point by putting said arm 50 under tension. In this construction the depression of the end of the spring-arm 50 is effected by means of a member carried by the connecting-rod 12, a circuit-breaking block 55 being adjustably clamped to said rod, as shown clearly in Figs. 13 and 17, and serving to break the circuit each time the shift-key is depressed for the purpose of moving the carriage to another case position. The arms 50 and 52 are independent, the former being always in engagement with the contact 47, excepting when operated on by the shift-key and the latter being adapted to be swung on its pivot either to close or open the circuit through the machine when the arm 52 is out of engagement with contact 46 as shown in Fig. 15, the circuit is broken and the adding mechanism is electrically disconnected from the operating parts of the typewriter.

The step-by-step movements of the carriage are employed as the means for determining which one of a series of adding wheels contained in the adding mechanism shall be operated on each depression of a figure key, and as these figures will be struck consecutively as the carriage advances, it will be seen that the adding wheels may be brought into operation successively, one at each depression of a figure key. The controlling device for accomplishing this result consists of two complementary parts, one of which is mounted on and moves with the typewriter carriage when the latter is connected to coöperate directly with the controlling device and the other member of which is mounted at some fixed point adjacent to the path of travel of the first. In this construction, the controlling device has one member, preferably an electrical contact-arm, such as 56, secured to the carriage by means of an arm 57, so as to travel therewith, and a series of controlling points or contacts are mounted on a column gage bar or support such as 59, similar to the main column gage bar or column stop bar carried by the typewriter carriage. This gage bar 59 may be fixed in any desired manner, and in this instance is attached to a bracket supporting certain parts of a tabulating attachment, and has a series of controller-contacts corresponding in number to any determined number of circuits which it may be desired to close from said controlling device to the adding wheels. In this construction, the contacts are carried by a contact block 60 secured to the column gage bar 59 and adjustable therealong, suitable holding or clamping means such as 61 being employed to maintain the block 60 in any desired position along said gage bar at the desired gage-marks. This contact block is adjustable along the graduated bar 59 by reference to the scale or gage marks on said bar, and the position to which this block is adjusted determines the position of the adding-column in the several lines of writing. This contact block with its appurtenances may, therefore, be termed an "adding-column gage." Said contact block has twelve contacts arranged in two rows and numbered from 62 to 73 inclusive. A greater number of contacts is provided than there are adding wheels in order that the connections between the controlling device and the adding mechanism may be varied according as it may or may not be desired to leave spaces between groups of orders in writing numbers for the insertion of punctuation marks or not as desired.

In addition to the parts hereinbefore described, as constituting necessary parts of the typewriting machine, I have also illustrated a tabulating device for facilitating the writing of numbers in columns when such tabulation is desired. This tabulating mechanism may be of any suitable construction and as shown herein is in the form of an attachment to the typewriter, it being essentially the Gorin tabulator as now applied to the Remington machine. It embodies in this construction the usual series of tabulating keys, such as 74, secured to tabulating rods or push-rods 75, having springs 75' for returning said rods to their normal positions, these springs being interposed between adjustable stops 75" on the rods 75 and a fixed attaching bar 76. At their rear ends the rods 75 pass through a bar 77 forming part of a clamping frame 78, constituting the lower portion of the main frame of the tabulating device, which main frame is clamped at its upper end to the rear edge 79 of the top-plate 4 by means of clamp-screws 80 carried by threaded clamps 81 adjustably secured to the frame 78. The upper portion of the frame 78 has the usual channeled head or bracket 82 in which are mounted for reciprocation denominational stops 83 in the form of slides connected respectively to the push-rods 75 by means of levers 84 pivoted on the frame of the tabulating device at 85 and having pin-and-slot connections at their lower ends with the push-rods 75 and also having similar connections at their upper ends with the slides 83. This connection between each slide and its lever is preferably formed by a pin 86 on the slide and a slot 87 in the upper end of the lever. Each of the slides 83 also has a stop face 88 for the purpose of operating a common releasing-bar 89, which in this case forms part of a U-shaped rock frame pivoted at 90 to the frame 78 of the tabulating device and has a forwardly extending rock-arm 91, by means of which the movements of the releasing-bar 89 may be imparted to the carriage-feed mechanism for releasing the same from the carriage and permitting the usual tabulating escape movement, the release of the feed device being effected in this case by means of a link 92 pivoted at its lower end to the inner end of the rock-arm 91 and a lifting lever 93 pivoted at its rear end to the upper end of said link 92 and near its center at a suitable fixed point 94 on the top-plate of the typewriter. The forward end of said lever lies immediately below the rack 95 and is adapted to raise the same from the pinion 26 and thus release the feed device from the carriage when it is desired to impart a tabulating movement to the latter. The column gage bar 58 of the typewriter carries the usual tabulating stop 96, which may be termed a "column gage" for the typewriter carriage. The bar 58 is secured to a pair of arms 97 extending rearwardly from said carriage, the stop 96 being positioned to project into the path of any one of the denominational stops 83 when one of such stops is operated by its key 74. The arms 97 are also detachably connected to the carriage, as by means of a clamp 98 and a clamp-screw 99.

From the foregoing description of the construction and organization of the tabulating device and the controlling device, it will be evident that if the tabulating stop 96 and the contact block 60 are placed in corresponding positions on the respective column gage bars 58 and 59, the contact-arm 56 may be brought into engagement with the first contact 62 of said contact block or with a succeeding contact by the action of the tabulating device, because, when the carriage is released on the actuation of the proper key 74, the carriage movement will continue until the denominational stop which is operated comes into contact with the tabulating stop 96, when the contact 62, or any other which corresponds in position to said denominational stop, will strike the contact-arm 56 and a circuit (to be hereinafter described) may be closed for effecting the rotation of the proper adding wheel. Thereafter, on the step-by-step movements of the carriage, the contact-arm 56 will be brought successively into engagement with the contacts 63, 64, etc., to close circuits successively leading to the other adding wheels for effecting their rotation in the proper order.

All of the contacts 62 to 73 inclusive are disposed adjacent to the common contact-bar 100 and co-act therewith in such a manner that the traveling contact-arm 56 will close the break between such contact-bar and any one of said series of contacts when opposite such contact. The free end of the contact arm 56 is preferably formed with three distinct branches, which may be made by saw cuts, as indicated at Fig. 13, the upper branch being adapted to the upper row of contacts 63 to 73, the lower branch being adapted to the lower set of contacts 62 to 72 and the middle branch to the common contact bar 100. By this construction the proper contact of the spring arm 56 with the contacts on the block 60 where there may be some irregularity in projection in the cutter, is always insured. This contact-bar 100 is connected through a wire 101 with the contact-spring 45, bearing against the terminal 36, which in turn is connected with the wire 48, the switch-arms controlled by the shift-key and the hand switch, the wire 49, the universal-bar-operated contact 39 (when the latter is in engagement with the contact 40) and the contact-arm controlled by any figure key that may be depressed. All of the wires leading from the typewriting machine proper may be assembled in a cable, such as 102, leading to the adding mechanism controlled by the figure keys and this adding mechanism will now be described.

Referring first to Figs. 19 and 20, 103 designates a case in which all of the parts of the adding mechanism may be contained, and the cable 102 leading from the typewriting machine enters this case at a suitable point and its various wires are then connected to the different electrically-operated parts, which in the preferred construction constitute important features of my improved adding mechanism. For the sake of convenience in mounting the various parts of the adding mechanism, I prefer to make use of a plurality of parallel plates or partitions (see Figs. 1 and 3) disposed transversely and dividing the interior of the casing 103 into a number of compartments, one for each of the adding wheels, while other portions of the space within such casing may be occupied by various other parts, such for example as a solenoid for turning the adding wheels, a series of electro-magnets controlling stroke-determining devices governing the extent of rotation of each adding wheel, a smaller solenoid, the function of which will be hereinafter set forth, and certain other mechanical parts common to all of the adding wheels. Here the space within the casing is divided into twelve transverse compartments formed by four long partitions designated respectively by 104, 105, 115 and 116, and nine short partitions designated respectively by 106 to 114 inclusive, which short partitions divide the space between the long partitions 105 and 115 into ten equal small compartments, one for each of the adding wheels and parts co-operating directly therewith.

In a space back of the adding-wheel compartments and between the partitions 105 and 115 and the back of the casing, I prefer to mount a solenoid, such as 117, for the purpose of transmitting power to the wheel-actuating mechanism. In the construction shown this solenoid is firmly secured to a base 118 extending from the partition 105 to the partition 115 and secured thereto so as to space said partitions at a proper interval and brace the same. The solenoid 117 is a double one in this case and is horizontally disposed, the two cores 119 and 119' thereof being connected by a yoke 120, to which are adjustably attached connecting rods 121, passing through openings in the solenoid end-plates 122 and 123, which are themselves secured directly to the base-piece 118. At their opposite ends the rods 121 are connected together by a coupling 121ª which is pivoted to the lower end of one arm 124 of an angle-lever pivoted in a block 125 screwed to the partition 105, and the other arm 126 of said angle-lever projects through said block 125 and through said partition and is pivoted at its outer end to a link 127, the lower end of which is pivoted in turn to a lever 128, which it straddles, said lever having at the long end thereof a gear-segment or curved rack 129 adapted to impart movement to a common rotary actuator or shaft to which each adding wheel, as selected, is intended to be coupled. This lever 128 may have a strong retracting spring, such as 130, which in this case is connected to the short end of the lever for imparting such return stroke. An adjustable stop, such as 131, may be employed for determining the exact point at which the working stroke of said gear-segment and lever will begin.

It will be evident that the segment 129 constitutes part of the adding-wheel-actuating means, and it is therefore an adding-wheel actuator, but I prefer to operate the adding wheels directly from a rotary actuator or shaft geared to said segment, as by means of a pinion 132, which may be a separate element secured to such rotary actuator. In the construction shown, the shaft 133, which passes through the partitions 105 to 115 inclusive, constitutes this rotary adding-wheel-actuator and is intended to be connected directly with any one of the series of adding wheels employed in the adding mechanism. Said shaft passes through a series of short sleeves or hubs 134, fixed each at one end to its respective partition, one hub for each of the adding wheels. In order to avoid friction the shaft 133 is mounted at near its ends in bearings in the partitions 104, 105, and 115, and passes centrally through the hubs 134 without contacting with the interiors thereof, the shaft being of less diameter than the bores of the hubs. Adjacent to the free end of each hub 134 is fixed on the shaft 133 one member 135 of a clutch mechanism, there being thus ten such clutch members 135 corresponding to the number of adding wheels employed in this machine. Tie-rods 134′ and 134″ and spaced-pieces 135′ and 135″ are employed for spacing the partitions and holding the same firmly.

The adding wheels, by means of which the adding of the various figures selected by the figure keys is to be performed, are not supported by the shaft 133 but are loosely mounted on the bearing hubs 134 in such a manner as to be quickly coupled with the shaft 133 whenever it is desired to turn one of them to add a number. Any suitable coupling means may be employed for accomplishing this result, and in the construction shown each of the adding wheels is designated by 138 and has thereon a clutch member, such as 139, complementary to the clutch member 135 on the shaft 133. When these complementary clutch members 135 and 139 are brought into engagement by a longitudinal movement of one of the parts relative to the other, it will be evident that such adding wheel may then be turned by the shaft 133 and in unison therewith. An adding mechanism having a common actuator coöperating with a series of adding wheels any one of which may be selected and coupled to the shaft without operating the other adding wheels is an important feature of my present improvements, and either one of the co-acting members may be shifted in the direction of its axis to effect an engagement of said parts. I prefer to impart such an axial movement to the adding wheel itself, and an adding wheel mounted to turn for the purpose of adding the various numbers selected and to move axially to clutch its actuator is also an important element of the invention illustrated herein. The complementary clutch members on these parts may be of any suitable construction but I deem it advisable to make use of a coupling device consisting of one clutch member or clutch-pin 140 projecting from the member 135 and a circular series of clutch-pins constituting the complementary clutch member 139 and forming substantially a clutch-pinion, a single clutch-pin coöperating with a clutch pinion serving to permit the parts to move into and out of engagement positively but freely and without binding.

The adding wheels themselves should be as light as possible, in order that they may respond quickly when called into action and also be stopped quickly and easily as soon as they reach the ends of the desired movements. For these reasons the wheels 138 are preferably made of thin sheet metal having a web portion with an annular flange 141 at the inner side of said web and forming a wheel-rim on which the figures "0" to "9" inclusive may be positioned and properly spaced. Each of these adding wheels also has a hub portion 142 which in the normal position of the adding wheel is adjacent to the nearest partition and has a groove 143 in which the operating end of a clutch-shipping arm or shipping lever 144 may work. Each of these shipping-levers 144 constitutes the principal element of a clutch-shipping device for connecting its respective adding wheel to and disconnecting it from the actuator 133, and in the preferred construction each shipping device embodies also an electromagnet, such as 145, for operating the shipping-lever 144 in one direction and a spring for imparting a return stroke or unclutching movement to the adding wheel. By referring to Fig. 1, it will be seen that all of the electro-magnets 145 are suspended from a common supporting bar 146, fastened at its ends to the partitions 105 and 115 and serving to space said partitions at the upper ends thereof (see Figs. 1 and 3). Said electro-magnets are disposed in two rows or series but are connected to the bar 146 substantially at the center line thereof, this connection being effected in the present case by means of screws 147 passing through nuts 147', adjustable up and down in threaded openings in the bar 146 and held in place in their adjusted positions by means of set-screws 148. By means of these nuts the electromagnets 145 may be adjusted up or down to shift the core of the electro-magnet toward or from the co-acting armature, and thus regulate the throw of said armature 150 and which together with the shipping arm constitutes the shipping lever 144. A non-magnetic projection 149 prevents actual contact of armature 150 with the core of the magnet, thus avoiding magnetic sticking of the parts and enabling the armature to be more quickly restored to normal position. The armature is made U-shaped in plan view and hinged or pivoted to bearing blocks 150ª secured to the upper ends of the partitions. The hub 142 is out of contact with its partition and the bend 144ª in the shipping lever 144 limits the return movement of the adding wheel when uncoupled; while the projecting portion 149 of the magnet through the lever 144 serves to limit the clutching stroke of the adding wheel to engage with the clutch member 135. The extent of the engagement of the clutch-pins will thus be regulated by the electro-magnet 145. The parts are so adjusted as that the lateral clutching movement of the adding wheel is arrested before the teeth of the pinion come into face contact with the inner side of the clutching member 135 so as to avoid any pressure of the clutch teeth against the member 135 and thereby friction of the lower end of the lever 144 against the inner wall of the groove 143 in the hub of the wheel which would have a retarding effect on the latter.

The return or unclutching stroke of each adding wheel may be effected in any desired manner, but in this case I have shown at 151 a rod which passes through all of the short partitions before described and into the longer partition 115, this rod being straddled by all of the shipping-levers 144 and having a series of coiled springs 152 interposed between each of said shipping-levers and the opposite partition, for the purpose of returning said shipping-lever to its normal position when the circuit leading to the corresponding electro-magnet 145 is broken.

While the devices hereinabove described constitute a suitable means for operating the adding wheels to turn the same as they are selected, it is evident that they alone are not capable of determining the extent of rotation of each adding wheel for the different digits from "1" to "9" inclusive. In order to turn the adding wheels different distances corresponding respectively to the different figures represented by the figure keys and by the figures marked on the rims of said adding wheels, it is necessary that the rotary adding-wheel-actuator or shaft 133 have a variable vibratory or oscillatory movement, the extent of which will correspond to the figure key struck. In the present construction the gear-segment or rack 129 constitutes a variable-stroke adding-wheel-actuator, as does the shaft 133 to which the movement of said gear-segment is directly imparted. As has been stated, the adjustable stop 131 limits the movement of said gear-segment in one direction, and if its movement in the other direction is determined by a plurality of devices capable of stopping the oscillation of said gear-segment at different points in its working stroke and these points correspond to the number of feed units which the shaft 133 should turn for the figure key struck, the adding wheels may be turned the desired distances when coupled to said shaft. Here this variable-stroke adding-wheel-actuator 129 has a plunger 153, pivoted thereto for movement in unison therewith and this plunger is intended to move substantially in a straight line and be stopped at different points in such stroke by means of suitable stroke-determining devices for limiting its movement.

I prefer to make use of a series of eight stops such as 154 to 161 inclusive, all of which may be movable in parallel paths, perpendicular to the path of movement of the plunger 153, the stop-faces of these stops being located at unit distances apart. These eight stop-arms or slides serve to control in this instance the feed movements for digits "1" to "8" inclusive, while the stop wall 162 of a box or guide 163, in which said slides may be mounted, may serve to indicate the feed for the figure "9", this wall being also located at a unit distance from the stop-face of the slide 161. The box 163 may be of any suitable construction and is preferably fastened to the inner side of the partition 104 near one side of the compartment between said partition and the adjoining long partition 105. Said box constitutes a guide for said slides and has therein a series of parallel guide-ways intersected by a transverse bore 164 in which the plunger 153 is operable. The various stop-arms or slides 154 to 161 inclusive, also have openings therein, such as 165, equal in area to that of the opening 164, for the purpose of preventing or permitting the passage of the plunger 153, according as the plunger is or is not to be stopped by such slide. The manner in which the slides operate will be evident by referring to Fig. 5 in which it will be seen that all of the slides except that numbered 157 have their openings positioned to register with the bore 164, while the opening in the slide 157 has been projected beyond the bore 164 and said slide forms a stop for limiting the movement of the plunger 153. In order to limit the movements of the slides and assure registration of their openings with the opening 164, I provide a stop-pin 175' adapted to come in contact with the end walls of notches 175'' in the slides.

The stop-arms or slides just described may be operated in any suitable manner but I prefer to control their movements by means of electro-magnets, eight of which are shown herein and are secured to a spacing board 166, preferably vertically disposed and also screwed to the partitions 105 and 115, near the back of the adding mechanism. The eight electro-magnets controlling the movements of the stop-arms or slides, and hence constituting parts of the stroke-determining means for governing the extent of rotation of the shaft 133 and of each adding wheel coupled thereto, are designated by 167 to 174 inclusive and each preferably has a horse-shoe-shaped core with two poles, the construction being substantially the same as that of the electro-magnets 145 hereinbefore described for coupling the adding wheels to the shaft 133. A helix 174' similar to the electro-magnets 167 to 174 is employed as a resistance coil to balance the circuit when the wheel is to turn nine units. Each of the stop-arms or slides 154 to 161 inclusive is preferably connected to a lever secured to the armature of one of these electromagnets, and while these levers are of different lengths their leverages are equalized as nearly as possible and a description of one will suffice for all. One of the levers is pivoted at 175ª to an arm or hanger 176 fastened to plate 166, on which the magnets 167 to 174 are mounted. Said lever 175 is pivoted at the extreme lower end of said hanger and the long arm of the lever is reduced to enter a notch 177 in one edge of the corresponding stop-arm or slide, while to the short end of said lever is fastened the armature 178 of the electromagnet 169, this armature having, in the preferred construction, an adjusting screw 179 and a check-nut 180 for preventing contact between said armature and the poles of the electro-magnet 169 and also for regulating the stroke of the lever 175. All of the levers for the electro-magnets 167 to 174 inclusive are held in and returned to their normal positions by means of springs 181, these springs holding the slides in the box 163 in such positions that the openings therein normally register with the bore 164, said springs being broken away in Fig. 3 to show other parts.

In addition to providing means for coupling the adding wheels to and uncoupling them from the actuator 133 and stopping the movements of such adding wheels at the ends of strokes corresponding to figures represented by the respective keys struck, it is important to safeguard the operation of the adding mechanism in such a manner that the adding wheels will neither register more than the proper number of feed-units nor slip back after having been moved to the desired points. For this reason, and particularly in connection with such a high-speed adding mechanism as I have illustrated, I prefer to employ devices for preventing back-lash and for returning each adding wheel to its normal position in case of over-rotation. The device for restoring a wheel to its proper position will also preferably coöperate with a device for preventing back-lash of said wheel, the proper coöperative relation of these two devices being best established by means of a circular series of stops or stop-pins movable in unison with the wheel and corresponding in number to the number of figures displayed thereon and also disposed at equal or unit distances apart. Such a circular series of stops is represented herein as ten pins 182 projecting from the web portion of each adding wheel on the same side as the hub 142. These stop-pins project laterally from each adding wheel and the devices which coöperate therewith for preventing back-lash and returning the wheel in case of over-rotation may be a pair of pawls, such as 183 and 184, the former of which is the back-lash pawl and may have its working end concaved slightly for co-action with the stops 182. All of these pawls 183 for the series of adding wheels may be mounted on a common rod 185 extending through the various partitions hereinbefore described, and each may have a heel portion 186 constituting a stop finger adapted to engage a stop, such as 187, which may also be a stop-rod passing through such partitions and common to all of the back-lash pawls. The movement of these back-lash pawls in the other direction may be limited by a similar stop-rod, such as 188, and each back-lash pawl may be returned to its normal position by means of a coiled spring 189 (see Fig. 4).

When any adding wheel is turned (its movement being in the direction of the arrow shown in Fig. 4), it will be evident that the toe or point of its pawl 183 will be raised slightly each time that a stop-pin 182 comes under the same and will instantly be returned to its normal position by means of the spring 189, so that if the wheel has once accomplished a complete progressive movement of one unit or a plurality of units backlash will be impossible, because the pawl 183 and its stops form a solid abutment past which no stop-pin 182 can travel. Should the adding wheel accomplish a slight over-rotation, however, or any amount of over-rotation less than a whole unit—and the parts are so organized that any over-rotation will always be a small part of one unit—the device for compensating for this over-rotation will then come into action and return the adding wheel to its proper position.

The pawls 184 for returning the adding wheels are also all preferably mounted on a common rod 190 extending through the aforesaid partitions, and the movements of said pawls in both directions may be limited by means of a stop-rod 191 similar to those just mentioned. Each of the pawls 184 is placed substantially radially to its adding wheel so as to have a considerable oscillatory movement, and each time that a stop-pin comes in contact with the point of such a pawl and advances a unit distance said pawl will be turned until it reaches a point where it will release itself from said pin, whereupon it will be instantly returned, by means of a spring 192, into the path of the next pin 182. This spring normally holds its pawl 184 against the stop 191 in the position shown in Fig. 4, but if at the end of any adding movement of its wheel this pawl has been shifted and has put its spring 192 under greater tension the pull of this spring will be sufficient to press against a pin 182 and move back the adding wheel the short distance represented by such overthrow and thus return said wheel to the proper point after said wheel is released from the clutch member on the shaft 133, and against the point of pawl 183 which arrests said wheel. It will be evident, therefore, that the movement represented by any selected figure key will always be accurately registered and the adding mechanism will always perform the adding operations properly. Moreover, it will be seen that by providing these pawls for preventing back-lash and compensating for over-rotation a tooth-space on the clutch-pinion of each adding wheel will always be opposite the complementary clutch-pin on the shaft 133 at the beginning of the coupling operation.

In any type of adding mechanism, the amount registered by any wheel of a lower order must always be transferred to the adding wheel of the next higher order when the limit of registration on the wheel of the lower order is reached. Carrying devices of various constructions have been employed for this purpose, but I have illustrated herein a carrying mechanism suitable for use with a series of adding wheels capable of performing addition by the decimal system, in which mechanism the movement of an adding wheel of a lower order is not employed to operate the wheel of the next higher order but instead controls the movement of a carrying device which is operated by power other than that required for turning the wheel of such lower order. In the machine illustrated in these drawings, the figure keys control the units-registering movements of each adding wheel (conjointly with the electrical controller governed by the movements of the typewriter carriage) but in no case is any additional tension put upon such figure keys for performing the adding operation, the adding movement of each wheel being derived from a source of power or power device other than that required to operate the keys; that is to say, other than the finger power exerted by the operator. For this reason, it will be evident that a carrying device controlled by an adding wheel and independent of the power required to operate such wheel is operated in this case by a source of power separate from that required to impart the units-registering movements to said wheel and also separate from the finger power required to call such wheel into action for registering a given number. Here there are ten adding wheels and nine carrying devices, one for each of the orders or denominations except the highest. Each carrying device is preferably held under restraint by a detent, which may be in the form of a holding or tripping pawl, and is provided with a spring for imparting to it a working or carrying stroke when it is released by said pawl. Each carrying device shown herein is mounted on a rod, 193, which may pass through the various partitions that space the adding wheels, and said carrying device may be in the form of a lever, to the short arm 194 of which a spring 195, such as that just mentioned, may be secured, while the long arm 196 of the lever may coöperate with a series of elements on the adding wheel, in this case the pins 182, for turning the proper wheel one unit when such carrying lever is actuated by the spring 195. In order that the carrying device may coöperate with these pins without interfering with the same or with the normal registering operation of the wheel to which such pins are secured, I prefer to provide on each carrying device a by-pass pawl 197, which is pivoted at 198 and has a working portion or toe of considerable length and so shaped as to coöperate perfectly with the pins 182, the lower edge of this toe portion being preferably defined by a convex curve and the pawl itself having a spring 197' to return it automatically to its lower position, shown in Fig. 4, after it has been shifted. The heel 199 of this pawl may engage a stop, such as 200, when the pawl is in such normal position.

The tripping devices, by means of which the carrying devices are held normally out of action, are all preferably mounted on a common carrier or rod 201, extending through the partitions just mentioned, and each pawl may have a detent portion 202, a spring 203, for holding the pawl in engagement with the carrying lever, and an actuated portion or tripping arm 204, having a pin 204' extending into the path of a carrying member on the corresponding adding wheel and adapted to be operated by such carrying member to release the carrying lever. The carrying member on each adding wheel is in this construction a carrying pin 205, and when it engages the pin 204', at the end of a complete rotation of the adding wheel, the detent 202 will be released from the corresponding stop-face 206 of the carrying lever, which said detent normally engages, whereupon said carrying lever, which is normally out of the path of the pins 182, will be actuated quickly toward the adding wheel and the end of the pawl 197 will come into contact with one of said pins and turn the adding wheel a unit distance. On the return of the carrying device to its normal position, the pawl 197 will ride over the next succeeding pin 182 and will be shifted slightly from its normal position, thus removing from the adding wheel substantially all of the friction of the carrying device.

By referring to Fig. 4, it will be seen that the carrying lever 196 has a curved face 207 adjacent to the stop-face 206, and that this curved face is so disposed that the second pin 182 below the one engaged by the pawl 197 will come into contact with such curved face and be stopped thereby at the end of the carrying movement as shown in dotted lines at Fig. 4. This device effectually prevents an excessive carrying movement of the adding wheel.

From the foregoing description of the construction and mode of operation of the means for imparting the normal registering movements to the adding wheels and of the carrying devices associated therewith, it will be seen that each pair of adding wheels has two different operating means co-acting therewith for performing addition, one of these means serving to rotate the first adding wheel of each pair, that is, the one representing the lower order or denomination, while the other actuating means is a carrying device which transmits to the second wheel, or wheel of higher order, through the stop-pins projecting laterally therefrom, a carrying movement controlled by the first of said wheels and its associated controlling device or tripping pawl co-acting with such carrying device. It will also be evident that each of the carrying devices or levers just described constitutes a carrying escapement adapted to actuate the second adding wheel of each pair or series, that is, the wheel of higher order or denomination, every time that the first adding wheel of the pair, or wheel of lower order, makes a complete rotation, and that this carrying escapement has the chief functions of all other types of escapements, that is, it serves to impart a definite or unit movement to the member which it operates and positively checks the movement of such operated member at the end of the stroke, but the adding wheel, when in its normal position, is always free to be turned by the first mentioned actuating means. The return stroke of each carrying device is also preferably controlled by a power device other than that from which its working stroke is derived, and hence said carrying device is not only frictionally disconnected from the keys but also has two strokes governed by power devices separate from each other and from that which is employed as a means for normally rotating the adding wheels.

I prefer to control the return stroke of each carrying device by means of an electromagnet, which in this case is a solenoid 208 located in the extreme left-hand compartment between the partitions 115 and 116 and connected in circuit with the figure keys in such a manner (as will be hereinafter more fully set forth) as to operate practically instantaneously when a figure key is struck, and immediately restores to its original position any carrying device that may be in the path of the stop-pins 182. This solenoid may be supported upon a bracket 209 spacing said partitions and fastened thereto and it is also preferably a double solenoid having a pair of cores 210 connected by a yoke 211, which in turn is connected by means of a short link 212 to a lever 213 pivoted near its center on a rod 214 passing through the partitions 115 and 116, said lever being normally held against a stop 215 by means of a spring 216. At its opposite end the lever 213 is connected to a hook 217, which constitutes one element of a quick let-off device controlling the return movement of another device which on its working stroke imparts a return stroke to any carrying device not in its normal position. I prefer to employ means common to all the carrying devices of the series for imparting such return stroke and hence any one or all of the carrying devices may be instantly actuated by a common operating member, which in this construction is a rock-frame made up of two or more rock-arms 218 secured to a rock-shaft 219 extending through the various partitions adjacent the adding wheels, said rock-arms carrying at their outer ends a bar or rod, such as 220, constituting substantially a universal-bar, which is movable in slots 221 in the partitions (see Figs. 4, 5, 6 and 11). This rock-frame normally stands in the position shown in Figs. 4 and 6, with its bar 220 adjacent to the outer edges of the long arms 196 of the carrying levers when said levers are in the paths of the pins 182, and when actuated said bar 220 serves to return the carrying devices practically instantaneously to the position shown in full lines in Fig. 4. This movement is imparted to the rock-frame by the hook 217 when the latter is drawn down on the energization of the solenoid 208, and said rock-frame may be returned to its normal position close to the adding wheels by means of a spring, 222, as soon as each carrying device is caught by its detent 202. In this construction the spring 222 is connected to a hooked rock-arm 223 adapted to be engaged and released by the end 224 of the hook 217, the co-acting portions of the hook and the arm of the rock-frame constituting elements of the quick-acting means hereinbefore alluded to for releasing the rock-frame as soon as it has performed the operation of imparting the return stroke to each carrying device. The point of let-off of the hook 223, and consequently the point at which the rock-frame may begin its return movement, may be adjusted as desired, and in Fig. 6 I have shown at 224' an adjustable eccentric stud, which may be shifted in either direction to change the angular position of the hook 217 which it engages, and thus shorten or lengthen the throw of the hook 223, the hook 217 having a cam-face 217' co-acting with the eccentric stud 224' to shift the hook 217 to the right on the downward stroke thereof and release the hook 223 sooner or later, the hook 217 on the completion of its downward stroke being returned to its normal position, as by means of a coiled spring 225, after the rock-frame has been returned by the spring 222. Guide-pins 226 may be employed for guiding the upper end of the hook 217.

Immediately below the lever 213 I have shown (see Fig. 6) a pair of binding-posts or terminals 227 and 228 mounted on an insulating block 229, these terminals having contacts for controlling one break in an electric circuit and also having binding-posts to which are connected conductors 230 and 231. To one of these terminals, as 227, a circuit-controller or switch, which may be a spring contact-arm 232, is secured and it is adapted to be shifted by the lever 213 to close the circuit between the terminals 227 and 228 when the solenoid 208 is fully energized and the lever 213 reaches the limit of its working stroke. The closing of this break in the circuit is intended to make the circuit through the main solenoid 117 and control the rotation of the shaft 133 and the selected adding wheel coupled thereto.

As before stated, one of the most important features of my invention is the employment of electrically-controlled mechanism for governing the operations of the chief movable parts in order that the work required of the operator may be reduced to the minimum and may be limited to the mere manipulation of the keys. Most of the electrical devices for performing such movements have been hereinbefore described, viz., the large solenoid for turning the rotary adding-wheel-actuator, the small solenoid for returning the carrying devices to their normal positions, the electro-magnets for coupling the adding wheels selectively to the rotary actuator therefor, the electro-magnets for operating the stops to determine the extent of rotation of each adding wheel when any one of the figure keys is struck, the contact-springs operated by the movements of the figure keys, the contacts governed by the universal-bar of the typewriter, and the automatic electrical controller having a step-by-step movement governed by the corresponding movement of the typewriter carriage. All of these various parts are intended to be connected electrically in such a manner that, when any figure key is depressed, the proper electro-magnet for operating a stop to determine the extent of rotation of an adding wheel will be selected and also the electro-magnet for coupling the proper adding wheel to its actuator, it being evident that this latter operation will be determined by the automatic electrical controller for transferring the registering operation from one controller-contact to another and hence from one adding wheel to another. Moreover, the small solenoid 208 should also be energized at the same time, and its operation as before noted will close the circuit to the main solenoid 117 for turning the rotary adding-wheel-actuator. Preferably, every time a figure key is struck, the small solenoid and the respective electro-magnets for operating the stroke-determining stop and the clutch member on the proper adding wheel, will be connected in series in a single circuit, and this circuit should have at least two breaks therein, one governed by the figure key and the other by the automatic electrical controller, while another break may be closed at the same time by the universal bar. When all of these breaks in a single circuit are closed, all of the electro-magnets in such circuit will of course be energized, and at the same time the relay hereinbefore described, which is formed by the small solenoid and the circuit-controller governed thereby, will close another circuit or branch circuit for energizing the main solenoid, which will thereupon actuate the shaft to which the selected adding wheel is coupled. With a group of figure keys and a corresponding group of electro-magnets controlling the stroke-determining devices, and also when a series of electro-magnets is employed for transferring the adding operation from one to another of a large number of orders or denominations, it will be evident that these parts will be connected most advantageously in series-multiple, and such are the connections shown herein. Because of this, and also because of the fact that I make use of means for varying the electrical connections between the controlling points of the automatic electrical controller and the electro-magnets representing the orders or denominations of the figures to be registered, I deem it important to employ a switch-board for grouping at one point most of the connections required for such an electrical system.

A switch-board suitable for the purpose is shown at 233, at the back of the adding mechanism hereinbefore described, in order that it may be convenient of access for making the necessary electrical connections and testing the same. This switch-board, of course, is made of insulating material, and adjacent thereto and preferably above it, I have shown a pair of conductor bars 234 and 235, each of which constitutes a common terminal for a group of electro-magnets, the former being a common terminal for the electro-magnets 167 to 174 inclusive, controlling the stroke-determining stops and for the resistance coil 174', while the conductor-bar 235 constitutes a similar common terminal for the electro-magnets 145, these two conductor bars being secured to an insulating backing or block 236 and each being formed herein by two electrically-connected short bars. The individual binding-posts by means of which the wires from the respective sets of electro-magnets are connected to said contact-bars are designated generally by 237 and 238. Each of these sets of electro-magnets also has a corresponding set of terminals or binding-posts on the switch-board 233 and these terminals, in the case of the electro-magnets for the stroke-determining devices, are connected by wires directly with said electro-magnets and with the figure keys, said binding-posts being preferably double ones, that is to say, having openings at both sides of the switch-board for the reception of conductor terminals. These binding-posts are designated by 240 to 248 inclusive and are divided into two groups, five at one side of the switch-board and four at the other. The conductors which connect said electro-magnets and said resistance coil 174' with said switch-board terminals are designated by 250 to 258 inclusive. I have also shown nine other terminals from which connection may be made to the electro-magnets 145 controlling the coupling of the adding wheels to the shaft 133, these switch-board terminals consisting of seven terminals or binding-posts at the upper side of the switch-board and disposed in a series between the terminals 247 and 248, while two other terminals at the lower side of the switch-board complete the series of nine for making connection with said electro-magnets 145. These two lower switch-board terminals are designated respectively by 260 and 261 and the seven terminals at the upper side of the switch-board are designated by 262 to 268 respectively. In Fig. 18, the connections between the switch-board terminals 260 to 268 and the electro-magnets 145 are a series of conductors or wires designated by 270 to 278 respectively, these wires being connected with the two rows of electro-magnets 145, shown in Fig. 18, alternately, beginning at the left in said figure. The other side of each of the electro-magnets 145 is intended to be connected to the terminals 238 on the common conductor-bar 235, as already explained.

The two groups of contacts 240 to 248 at opposite ends of the switch-board may by wires be connected directly to the spring-arms 43 attached to the detachable insulating plug 42 by means of which an electrical connection between the typewriter and the adding mechanism is effected. The connections between said parts are effected in this case by a series of conducting wires 280 to 288, it being evident that these wires must connect the terminals 43 with said switch-board terminals in such a manner as to permit a circuit to be closed from each figure key to that electro-magnet which controls the movement of a stroke-determining stop corresponding to the figure key struck.

The connections to the electro-magnets 145 for selecting the adding wheels in the order in which figures representing different denominations are struck are made from the controlling points or contacts 62 to 73 inclusive of the block 60 on the typewriter, because in this construction the electrical controller in which these contacts are embodied governs the transfer of the registering operation from one order to another and hence from one adding wheel to another. There are twelve contacts through which branch circuits may be closed to the electro-magnets 145 and it will be apparent that as there are only nine of these last-mentioned electro-magnets, it will not be necessary to make use of all of the controller-contacts for operating said electro-magnets at any one time. Only nine controller-contacts will, of course, be necessary for effecting electrical connection with said respective electro-magnets and the additional controller-contacts are provided for the purpose of varying the connections between the controlling device and the adding wheels to permit punctuation marks, that is, the decimal-point and commas, to be placed at the proper points between the figures written on the typewriter. Thus, if figures are to be written without punctuation, it will be seen that the last nine controller-contacts, viz., 65 to 73, may be connected respectively with the corresponding nine electro-magnets 145 controlling the adding wheels. If figures are to be written with a decimal point at the proper place but without commas, the controller-contact 71 may be electrically disconnected from the electro-magnets 145, in which case the contacts 64 to 70 inclusive and 72 and 73 may be brought into operation; while if the decimal point and two commas are to be used, three of the intermediate controller-contacts may be electrically disconnected from the electro-magnets 145, in which case all of the other controller-contacts would be in circuit with such electro-magnets and the first contact 62 would be connected with the last electro-magnets 145 controlling the operation of the ninth adding wheel, which registers numbers of the next to the highest order or denomination.

As the adding wheels for registering tenths and hundredths—or units and tens, if no decimal point is used—represent the lowest orders or denominations, the connections thereof with the first two electromagnets 145 may always be the same, and hence the contacts 73 and 72 are shown on the diagram in Fig. 18 as directly connected with the two lower switch-board terminals 260 and 261 by means of conducting wires 290 and 291, so that there is a permanent or invariable connection from each of the contacts 73 and 72 through the switch-board terminals 260 and 261 and the conductors 270 and 271 to the first two electromagnets 145 shown at the left in said figure. In order to permit the use of punctuation marks between the figures, it is necessary to provide for varying or changing the connections between the controlling points or contacts 71 to 62 inclusive and all of the other electromagnets 145, and hence in this diagram the switch-board terminals 262 to 268, which are connected directly to the remaining electromagnets 145 in the proper order, are not connected directly to said controller-contacts 71 to 62 inclusive, but instead means are provided at the switch-board for connecting the terminals 262 to 268 inclusive with the respective controller-contacts of any desired group of contacts from 71 to 62, the connections between these controlling points or controller-contacts and the adding wheels being changed in any desired manner by properly varying the connections to the switch-board contacts 262 to 268, according as the figures selected by the figure keys are to be written with or without a decimal point or commas or all of these.

The controlling device or electrical controller and the connections between it and the adding wheels constitute a permutation controlling system for connecting any desired group of controlling points or controller-contacts with the electromagnets 145 in such a manner as to close circuits to said electromagnets through branch circuits leading from a series of points corresponding in position to the positions of the figures as written by the typewriting machine, and the manner in which these connections are changed will be clear by referring to Figs. 7 to 10 inclusive, in connection with the diagram shown in Fig. 18. Fig. 9 shows on a larger scale, and in detail, the switch-board connections illustrated diagrammatically in Fig. 18. In Fig. 9, four longitudinal rows of terminals are shown below the terminals 262 to 268 and preferably parallel therewith and so disposed that from each of said terminals 262 to 268 direct connection may be made with a transverse or vertical row, including one contact of each of such four longitudinal rows. Each of these longitudinal rows of contacts or terminals is intended to control a different mode of electrically connecting the electromagnets 145 with nine of the controller-contacts, the bottom row being brought into action in this construction when figures are to be written without punctuation between them; the next to the bottom row when only a decimal point is used to punctuate; the next to the top row being used when the figures are written with a decimal point and commas, and the top row being brought into action when the figures are written without a decimal point but with commas, as shown on index plate at Fig. 20. Moreover, each of these longitudinal rows of contacts is divided into two series, the contacts of each series alternating with each other, one series being connected directly with the switch-board terminals 262 to 268, while the other series is in circuit through suitable connections with the contact points of the electrical controller 60. In the upper row the contacts of the series connected with the switch-board terminals 262 to 268 are designated respectively by 310 to 316 inclusive, while the contacts to connect with the electrical controller are designated by 320 to 326 inclusive. In the next to the top row the contacts corresponding to the series 310 to 326 are designated by 330 to 336 inclusive; in the next to the bottom row by 350 to 356 inclusive, and in the bottom row by 370 to 376 inclusive. The contacts in the next to the top row which connect with the controller-contacts are designated by 340 to 346 inclusive, while the corresponding contacts in the next to the bottom row are designated by 360 to 366 inclusive and the corresponding contacts in the bottom row by 380 to 386 inclusive.

Owing to the fact that the connections from the controller-contacts 73 and 72 to the corresponding electro-magnets 145 remain unchanged, it will be seen that the permutation just referred to is controlled by varying the connections between the ten controller-contacts 71 to 62 and the seven switch-board terminals 262 to 268. Because of this, I have shown on the switch-board immediately below the groups of contacts just described, ten other contacts or terminals directly connected respectively to the ten controller-contacts 71 to 62 by means of conducting wires 292 to 301 inclusive, the corresponding ten contacts on the switch-board being designated respectively by 392 to 401 inclusive. For convenience, the contacts 392 to 401 are disposed in two parallel rows below the other contacts, but not all of the four contacts of any transverse row above them are connected to any one of the contacts 392 to 401. The manner of connecting these terminals is shown clearly in Fig. 9, from which it will be seen that at the extreme right-hand side of the switch-board the connections are not involved because but one controller-contact 71 is electrically disconnected from some of the contacts in the first transverse row of switch-board terminals to be connected directly with the controller; while at the left-hand side of the switch-board the connections are somewhat more complicated, because provision has to be made for electrically disconnecting three of the controller-contacts from some of the terminals in corresponding transverse rows on the switch-board. Each of the terminals 392 to 401 inclusive is permanently connected with the proper contacts in the aforesaid four longitudinal rows on the switch-board by means of conducting bars and branches, ten of these bars with their branches being shown, each bar, with its branches, being designated by 402 to 411 inclusive. The conducting bar 402 with its branches connects contact 392 with contacts 380 and 320; the bar 403 connects the contact 393 with contacts 381, 360 and 340; the bar 404 connects contacts 394 with contacts 382, 361, 341 and 321; the bar 405 connects contact 395 with contacts 383, 362, 342 and 322; the bar 406 connects contact 396 with contacts 384, 363 and 323; the bar 407 connects contact 397 with contacts 385, 364 and 343; the bar 408 connects contact 398 with contacts 386, 365, 344 and 324; the bar 409 connects contact 399 with contacts 366, 345 and 325; the bar 410 connects contact 400 with contact 326; and the bar 411 connects contact 401 with contact 346.

From the foregoing description, it will be seen that the four longitudinal rows of contacts immediately below the contacts 262 to 368 are divided into two series of alternating transverse rows, each series comprising seven up and down rows counted lengthwise of the switch-board, the rows of one series being alined with, and connected similarly to, the respective contacts 262 to 268, while the rows of the other series are variably or irregularly connected with the contacts 392 to 401. The transverse rows are to be considered in pairs, that is to say, the first and second rows, reading from the right in Fig. 9, work together; the third and fourth work together; the fifth and sixth, the seventh and eighth, the ninth and tenth, the eleventh and twelfth and the thirteenth and fourteenth, on the extreme left, work together. In each of the four longitudinal rows, the contacts of the two series alternate in such a manner that any two adjacent contacts of any pair may be readily connected by suitable circuit-controlling means to close a circuit from one of the controller-contacts of the block 60 on the typewriter to an electromagnet 145, and by employing a multipole switch adapted to close all of such pairs of contacts in a single longitudinal row, electrical connections may be established from the controller-contacts to all of the electromagnets 145 through any one of these four longitudinal rows of contacts on the switch-board. A multipole switch suitable for this purpose is clearly shown in Figs. 3, 4 and 7, and in the preferred construction is adapted to span all of the contacts of any one of these four central rows and to connect each pair of adjacent contacts of different transverse rows. Said multipole switch is designated by 415 and has seven circuit-controllers or contact devices for spanning the seven pairs of contacts in each longitudinal row, each circuit-controller in the construction shown being a substantially U-shaped spring-arm, the forked ends of which make contact respectively with adjacent switch-board contacts in different transverse rows, the contact device 420 spanning the contacts 310 and 320, the contact device 421 spanning the contacts 311 and 321, etc.

The switch 415 is adapted to be moved up and down so as to make contact with any one of the longitudinal rows of switch-board contacts, and according to its position it varies the electrical connections between the electrical controller and the adding wheels to correspond to the manner in which the figures are printed. This multipole switch in the present case has a slide 416 mounted in a vertical guide 417, so as to travel along said guide, and suitable means may be employed for holding the multipole switch in any one of its four positions, the means shown being a spring-pressed detent device 418 having a roller-detent 418' adapted to enter any one of a series of equidistant locking faces or rounded notches 419 in the guide 417, the slide 416 having a handle or finger-piece 416' projecting therefrom for the purpose of manipulating the switch. Two other switch-board terminals or binding-posts are shown at one of the lower corners of the switch-board, these terminals being designated respectively by 430 and 431. These constitute in the present case the main binding-posts to which conductors such as 432 and 433, leading from, and returning to, a suitable source of electric energy, indicated at 434, are connected. Moreover, said binding-posts should be connected in circuit with all of the principal electrically-operated devices hereinbefore described, so as to control the movements thereof, and in this case the terminal 430 is connected by a conductor 435 to the conductor-bar 235 while the other terminal 431 is connected by a conductor 436 to the small solenoid 208, which in turn is connected by a conductor 437 with the conductor-bar 234, these conductors serving to connect the small solenoid 208, the electro-magnets 145, the electro-magnets 167 to 174 inclusive, and the resistance helix 174', the controller-contacts 62 to 73, the key-operated contacts 43, the universal-bar or escapement rocker operated contact 39, and the contacts controlled by the shift-key and hand-switch in series-multiple with one another and with the source of energy.

The main solenoid 117, which is controlled by a relay formed by the small solenoid and the switch 232, may be connected in a circuit in any suitable manner, but I prefer to place it in a parallel branch of the main circuit from the source of energy 434 and operate it by means of a current from such source. For this reason, the conductor 230 is also connected to the binding-post 431 and leads to one side of the main solenoid 117 through the switch 232 and conductor 231, while the other side of said main solenoid may be connected to the other binding-post 430 by means of a conductor 438.

The mechanically and electrically operated parts and the circuits hereinbefore described constitute all of the elements necessary for operating an adding mechanism from the figure keys of a typewriting machine and transferring the registering operation from one wheel to another as different keys are struck and the typewriter carriage moves from one position to another. Every time that a figure key is struck when the contact-arm 56 is in engagement with a coacting controller-contact, a circuit will be closed through a key-operated contact and the universal-bar operated contact to the proper electro-magnet 145, the small solenoid 208 and that electro-magnet which controls the operation of the stop or stroke-determining device corresponding to the figure key struck, or the resistance coil 174'. It will be evident of course that even though a figure key be struck, no such circuit will be closed unless there is an electrical contact at the automatic electrical controller 60. For this reason addition will only be performed when the figure keys are struck at some point in the travel of the carriage within the range of the contacts on the block 60, and at any other point in a line of writing figures, as well as punctuation marks and letters, may be written without causing the adding mechanism to operate. The block 60 will therefore be set at that point in the length of the column gage bar or scale 59, which corresponds to the position at which it is desired to begin to write figures in columns and simultaneously add them. In such a case, it being understood that the tabulating stop 96 has been propely set, as soon as the proper denominational stop 83 is operated and a corresponding tabulating movement of the carriage accomplished, or as soon as the carriage has been fed step-by-step to the proper point, if the tabulating device is not employed for the purpose, the contact-arm 56 will come into engagement with the first controller-contact of any given series and the automatic electrical controller thus brought into action. On the depression of any figure key, when the carriage has reached this point, a circuit will be closed for effecting addition in the adding mechanism and an adding wheel will be rotated, the extent of rotation of course depending upon which figure key is struck.

Suppose that the figure key for the numeral "3" is struck, and it be assumed that the contacts 30 in Fig. 18, running from right to left, represent the numbers "1" to "9" consecutively, and that the carriage has been operated and figures written until the lowest order—hundredths or units—has been reached, then the third spring 30 will contact with the bar 31, counting from the right in said figure, and a circuit will be closed from the source of power 434, through the conductor 432, to the switch-board terminal 430, conductor 435, common conductor-bar 235, the first electro-magnet 145 for actuating the corresponding adding wheel, conductor 270, switch-board terminal 260, conductor 290, the last controller-contact 73 (which on the striking of the last figure key of the series will be in contact with the arm 56) of the automatic electrical controller, common contact-bar 100 of such controller, the contact 39, the switch-arms 52 and 50 of the shift mechanism, controlled by the universal-bar, conductor bar 31, and the third contact-spring 30 from the right in Fig. 18, from which the current will flow through conductor 282, switch-board terminal 242, and conductor 252, to the electro-magnet 169 controlling the operation of the stop for limiting the turning of the shaft 133 to a movement of three units, the current passing from said electro-magnet to the common conductor-bar 234, and traveling through conductor 437 to the small solenoid 208, which is energized to operate the mechanism for restoring the carrying devices to their normal positions, the circuit then continuing through conductor 436 to the switch-board terminal 431 and returning to its source through conductor 433. In order to complete this circuit, it is evident that three breaks are closed, one at the figure key, one by the spacing-rocker and one at the electrical controller, and when all three of these breaks are closed, three electro-magnets are energized, one controlling the selection of the first adding wheel, another controlling the operation of the stop or stroke-determining device for limiting the movement of the shaft 133 to three units and the third controlling the operation of the small solenoid. All three of these electro-magnets being in series are energized simultaneously, the parts controlled thereby will be operated practically simultaneously, the first complete operation which takes place being that of restoring the carrying devices to their normal positions, which is effected by means of the hook 217 and the rock-frame controlled thereby, the latter having a quick-let-off movement which permits it to return to its normal position instantaneously when it has completed the operation of restoring the carrying devices to their normal positions. At the same time that this action is taking place, the first adding wheel 138 is being shifted axially to couple it to the shaft 133, whereupon the coupled wheel will be in readiness to rotate the proper distance as soon as said shaft is turned; and at the same time also the electro-magnet 169 shifts the third stop 156 into the path of the plunger 153 to limit the movement of the latter, and hence of the rotary adding-wheel-actuator, to three units. All of these preliminary operations having been accomplished, this actuator may now be turned to operate the first adding wheel coupled thereto and register the number selected. This operation is accomplished by means of the large solenoid 117, the circuit through which is closed at the end of the working stroke of the core of the small solenoid 208, the circuit so closed being a parallel branch of the main circuit and proceeding from the switch-board terminal 430 through conductor 438 to the solenoid 117, and returning through conductor 231, terminal 228, switch-arm 232, terminal 227, and conductor 230 to the switch-board terminal 431. When this large solenoid is energized by the current passing through this parallel branch of the main circuit, the gear-segment or rack 129 is raised and the shaft 133 rotated in the direction of the arrow, as seen in Figs. 4 and 5, the ascent of said rack, and hence the extent of rotation of the shaft and the adding wheel, being limited by the stop 156 against which the plunger 153 strikes. All of these operations take place while the figure key is being depressed by the operator, and on the release thereof the circuit will be broken again at three points, one break being at the key-operated contact, another at the universal-bar-operated contact and the third at the electrical controller, owing to the fact that as soon as the figure key is released the carriage will move one step and carry the contact-arm 56 with it off from the last controller-contact 62. When the arm 56 is in engagement with any other than the last controller-contact on the block 60 and is shifted one step, it closes a break at the next succeeding contact, thus putting the system in condition to transfer the registering or adding operation to the next adding wheel to register a succeeding number of another order or denomination. Of course each time that a figure key is struck, the corresponding key-lever will be actuated to print said figure at the proper point in the movement of the carriage.

On the breaking of the circuit just described at the three points indicated, the two electro-magnets and the large and small solenoids being deënergized will permit the parts controlled thereby to return to their normal positions and the hook 217, which has a by-pass connection with the rock-arm 223, rides up over the latter and is again hooked thereto. The armature 150 of the first electro-magnet 145 of the series controlling the adding wheels is also released and the corresponding adding wheel uncoupled from the shaft 133 by means of its shipping-lever 144. Practically simultaneously the armature 178 and the lever 175 controlled by the electro-magnet 169 are retracted by their spring 181 and the slide 156 is retracted until its opening registers with the bore 164 in the box 163. On the uncoupling of the adding wheel from the shaft 133, the latter is then returned to its normal position by means of the gear-segment 129, which is operated by the spring 130 and moves back into engagement with the stop 131. All the parts will now be in their normal positions for carrying out a new cycle of operations and effecting addition at another adding wheel when another figure key is struck.

The circuit to the adding mechanism for registering the next to the lowest order will be closed through the controller-contact 72 and the switch-board contact 261 leading to the second electro-magnet 145, because the controller-contacts 73 and 72 are permanently connected with the first two electro-magnets 145. The controller-contact 64, which is the third from the last, will or will not control a circuit to the third electro-magnet 145 according as it is or is not intended to place the decimal point in advance of the numbers of the lowest two orders or denominations.

Of course it will be understood that the circuits to the electro-magnets controlling the coupling of the adding wheels are not closed in the order just described, but that the circuit to the electro-magnet and adding wheel of the highest order is closed first and that thereafter the circuits closed are to wheels representing lower orders until the wheel of the lowest order and its electro-magnet are reached. The circuits just traced, however, illustrate the simplest connections between the electrical controller and the electro-magnets 145 and have been traced first for that reason. The circuit which is actually first closed when the first figure, or figure of the highest order, of a series is to be written and registered depends upon whether the figures of the series are to be written with or without punctuation between them, the controller-contact through which the circuit is closed, when no punctuation is desired, being the contact 65, to which a circuit may be traced from the common contact-bar 235 to the last electro-magnet 145, conductor 278, switch-board terminal 268, and the bar 448 of a series of conducting bars, designated by 442 to 448 inclusive, which connect the similar transverse series of terminals upon the switch-board, the circuit from the last contact 376, of the series connected by the bar 448, to its coöperating contact 386 being closed at such time by the contact device 420 spanning the same, the further course of the circuit being through the conducting bar 408 to the terminal 398, from which the conductor 298 leads directly to the controller-contact 65. If, however, a full series of nine numbers is to be written with three punctuation marks for separating said numbers in the manner indicated on the drawings, it will be evident that the circuit for registering the number of the highest order will be closed to the ninth electro-magnet 145 through the twelfth controller-contact 62 as three of such controller-contacts will close no circuits to the adding mechanism. In this case the next to the top row of contacts shown in Fig. 20 is the only one of the four rows that require twelve controller-contacts, and for this mode of punctuating the multipole switch will be in position to span the next to the top row of the four central rows of terminals on the switch-board.

If it be assumed that the first figure, or figure of the highest order, to be recorded is a "4" and that the multipole switch spans the next to the top row of switch-board terminals, the following will be the full course of the circuit: from the source of power 434 through conductor 432 to the switch-board terminal 430; conductor 435; conductor-bar 235; the last electro-magnet 145 (this being the extreme right hand one in the lower row shown in Fig. 18); conductor 278; switch-board terminal 268; bar 448; terminal 336, (see Fig. 9); contact device 420 of the multipole switch; terminal 346; bar 411; terminal 401; conductor 301; controller-contact 62; traveling contact 56; common contact-bar 100; the universal-bar-operated contact-arm 39; contact-arms 52 and 50 of the shift mechanism; conductor 31; the fourth contact-arm 30, counting from the right in Fig. 18; conductor 283; switch-board terminal 243; conductor 253; electro-magnet 170; contact-bar 234; conductor 437; small solenoid 208; conductor 436; switch-board terminal 431, and conductor 433 back to the source. The closing of this circuit results in the energization of the two solenoids, the ninth electro-magnet for coupling the corresponding adding wheel, and the fourth electro-magnet for the fourth stop 157, and hence the figure 4 is registered on the adding wheel of the highest order but one by the movement of such adding wheel through a space of four units, the highest or tenth wheel being operable only by the carrying device.

In connection with the multipole switch, I may make use of means for indicating, at the outside of the casing 103 of the adding mechanism, which one of the rows of switch-board terminals said multipole switch spans and the exact point at which such electrical connection is effected. In this construction the handle 416', by means of which the multipole switch is moved up and down, preferably extends through an opening, 450, in the casing and constitutes a pointer which may coöperate with a fixed index-plate 451 on the back of the casing. The switch-board itself may also be mounted in such a manner as to have a swinging movement toward the rear of the mechanism, to permit connections at the inner side of the switch-board (see Fig. 8) to be readily made and inspected. In this construction two pivot-screws are shown at 452 at the bottom of the switch-board for connecting it to the partitions 105 and 115 and permitting this pivotal movement. A latch, such as the draw-bolt 453, may be employed for holding the switch-board firmly in place, the inner end of this bolt entering a socket in the adjacent end of said switch-board.

At the front of the casing, I provide an opening or openings, 454, through which the numbers on the adding wheels may be easily read, and on a guide bar 455, adjacent to said openings, I may provide indicators 456, slidable along said guide bar to the proper points between the figures of the adding wheels, to enable the operator to quickly and conveniently read the sum total of the register.

The various devices hereinbefore described are sufficient for the purpose of operating the adding wheels to register, but it is important to provide means for turning them and resetting them to zero. For this reason, I have provided resetting mechanism for first coupling each adding wheel to its actuator or shaft 133 and then turning such actuator and wheel until the adding wheel reaches its normal position, whereupon it should be uncoupled from the actuator and stopped in such position. Any mechanism suitable for the purpose may be employed to accomplish this result, but I have illustrated at 457 a shaft mounted in bearings in the partitions 104 and 105 and having connections for operating the gear-segment 129 and also for coupling with their actuator all adding wheels not in their initial positions. This shaft 457 may be squared at its ends to receive a handle or key 458 for turning such shaft, and a quarter turn thereof will be sufficient in this instance to reset all of the parts to their normal positions. This shaft 457 has two cams 459 and 460 thereon, the former of which is so shaped as to control the operation of the gear-segment 129, while the latter may govern the movement of the rock-frame having the bar 220, and also the movement of a coupling slide for shifting simultaneously all adding wheels not in their initial positions to couple them to the shaft 133. The bar 220 is held against the carrying levers to prevent the operation of said levers when the adding wheels are rotated by the resetting mechanism. The movement of the coupling slide is controlled here by means of a cam-block 461 on the side of the cam 460, each of the three cams just described serving in this construction to control a movement of a lever for transmitting the turning movement of the cam to the device governed thereby.

The lever controlled by the cam 460 is designated by 462 and is pivoted on a stud on the partition 105, the short arm of said lever co-acting with said cam and the long arm coöperating with a pin 464 carried by a rock-arm 463 secured to the end of the rock-shaft 219 opposite the hooked arm by which such rock-shaft is normally operated. The cam-block 461 coöperates with one end of a lever 465 pivoted in a split stud 466 on the partition 105, so that said lever will be movable at its ends toward and from said partition, the other end of the lever serving to impart a coupling movement to the coupling slide just referred to, which slide preferably extends through all of the partitions adjacent to the adding wheels and is designated generally by 467 (see Fig. 11). In this case, the slide consists of two rods 468 connected at their ends by yokes, the right-hand yoke being designated by 469, said slide also carrying a series of coupling devices, which may be blocks or arms through which the rods 468 may pass, the last one of these coupling devices forming the yoke for the left-hand end of the slide. In this construction there should be ten of these coupling devices, each of which is in the form of an arm 470 adjustable along the rods 468 and suitably held in place, by means of set screws 471, each of said arms lying adjacent to an adding wheel and having a coupling pin 472, which may be brought into engagement with the outer side of the web of its co-acting adding wheel to shift such wheel and bring its clutch member into engagement with the corresponding clutch element on the shaft 133. As all of these pins 472 move with the slide 467, it will be evident that all of said wheels may be shifted simultaneously to clutch them to said shaft. As it is necessary to release each wheel from the shaft as soon as the wheel is reset to "0", I prefer to provide in the web of each adding wheel an opening or slot 473 so located that the edge of the slot will snap over the pin 472 and the wheel be unclutched by the spring 152 and the shipping lever 144 when such wheel reaches its initial position. Moreover, as all of the adding wheels will preferably be identical in construction, it will be seen that whenever the slide 467 is shifted to the left in Fig. 11, all wheels not in their initial positions will be shifted by it and clutched to the shaft 133, while the pins 472 will pass through the slots 473 of those wheels which are in their initial positions and will not shift such wheels.

It will be evident from the foregoing that I employ, in connection with the adding wheels, coupling means controlling the adding movements of said wheels, and separate coupling means controlling the resetting movement of said wheels, the slide 467 being brought into action only when it is desired to reset the wheels to their initial positions. The uncoupling means controlling the uncoupling of the adding wheels during the normal operation of the mechanism, may be employed, however, to uncouple such wheels at the end of the resetting operation, the springs 152, as has been seen, operating to return the shipping-levers 144 and the adding wheels, in the grooved hubs of which the shipping-levers engage, to their normal positions when the outer walls of the webs of the adding wheels are released from engagement with the pins 472, said spring and shipping-lever forming a quick-let-off uncoupling device. The release of any adding wheel takes place when said adding wheel is in the position of the central adding wheel shown in Fig. 11, that is to say, when such adding wheel moves to a point where the slot 473 is opposite its pin 472, when the spring 152, and the shipping-lever 144 appropriate thereto, will shift the adding wheel along the shaft 133 to its original position. Of course this movement of the adding wheel will cause the pin 472 to project through the slot 473 and will serve to prevent any accidental movement of said adding wheel until all of the adding wheels are restored to the same position. At the proper point the slide 467 may be retracted in any suitable manner, as by means of springs 474 coiled around the rods 468 between the yoke 469 and the partition 105, these springs when released being effective to impart a quick-return movement to each coupling member and its pin 472.

The cams 459, 460 and 461 are so shaped and located that, when the shaft 457 is turned, the short end of the lever 462 and the inner end of the lever 465 will first ride up their respective cam-faces, the former lever thus operating the rock-frame secured to the rock-shaft 219, to shift all of the carrying devices away from the adding wheel so that they will not interfere with the resetting thereof, the bar 220 which operates said carrying devices constituting during the period of the resetting operation a blocking device or blocking-bar for preventing such interference; while the lever 465 forces the slide 467 toward the adding wheels and each pin 472 not opposite a slot 473 shifts an adding wheel along its shaft 133 and clutches it to such shaft. Immediately after these actions take place, the cam 459 begins to raise the lever 128, and the gear-segment 129 turns the pinion 132 and hence the shaft 133, this turning of the shaft continuing until the segment 129 is a little beyond the position shown in Fig. 11, and each adding wheel, as its slot 473 comes opposite its pin 472, being quickly released and unclutched and snapped back into its original position of the shaft. On the return of the shaft 457 to its original position, the lever 465 will ride down the cam-block 461 and the springs 474 will return the slide 467 to its normal position, the lever 128, with its rack 129, and the lever 462, with its rock-frame including the blocking-bar, also returning to their original positions during this movement.

I prefer to cut away each of the cams 459 and 460 to form stop faces, such as those shown at 475 and 476 on the cam 459, a suitable stop, such as the stop-rod 477, co-acting therewith to limit the range of the resetting movement of the shaft 457 to about a quarter turn. I also provide means for automatically returning said shaft 457 to its original position (shown in Fig. 5) after the key 102 has been turned to reset the adding wheels, a coiled spring, 478, being secured at one end to the stop-rod 477 and at the other end to the shaft 457 and serving to return said shaft the moment said key is released, thus rendering it unnecessary for the operator to do more than turn the key in one direction to reset the parts.

It should be understood that in so far as the broader features of my invention are concerned, I do not limit myself to the details of construction shown herein, as all of these may be variously modified without departing from the gist of my invention.

The means disclosed herein for cutting the adding mechanism out of operation when the case shift key is depressed is not of my invention but is the invention of Burnham C. Stickney.

What I claim as new and desire to secure by Letters Patent, is:—

1. The combination of a series of figure keys, a series of adding wheels, a selective controlling device coöperative with each of said keys and having a plurality of relatively fixed controlling points governing said adding wheels selectively, and changeable connections between said controlling points and said adding wheels.

2. The combination of a series of figure keys, a series of adding wheels, a controlling device coöperative with each of said keys and having a plurality of controlling points governing said adding wheels for the purpose of selecting the adding wheel to be operated, said controlling points differing in number from said adding wheels.

3. The combination of a series of figure keys, a series of adding wheels, a controlling device coöperative with each of said keys and having a plurality of controlling points governing said adding wheels and greater in number than such adding wheels, and changeable connections between said controlling points and said adding wheels.

4. The combination of a series of figure keys, a series of adding wheels, a controlling device coöperative with each of said keys and having a plurality of controlling points governing said adding wheels and greater in number than such adding wheels, and a permutation connector system between said controlling points and said adding wheels for connecting with said adding wheels any series of points less than all of said controlling points.

5. The combination of a series of figure keys, a series of electrically-selected adding wheels, an electrical controller coöperative with each of said keys and controlling said wheels selectively, and a switch-board for varying the connections between said controller and the adding wheel.

6. The combination of a series of figure keys, a series of electrically-selected adding wheels, an electrical controller coöperative with each of said keys and controlling said wheels selectively, and a multipole switch controlling a plurality of connections between said controller and the adding wheels.

7. The combination of a series of figure keys, a series of electrically-selected adding wheels, an electrical controller coöperative with each of said keys and controlling said wheels selectively, a plurality of groups of connections between said controller and the adding wheels, and a multipole switch controlling said groups selectively.

8. The combination of a series of figure keys, a series of electrically-selected adding wheels, an electrical controller coöperative with each of said keys and having a plurality of contacts, a switch-board having two sets of terminals, one set connected electrically with the adding wheels and the other set with said controller contacts, and means for connecting different groups of one set of switch-board terminals with the other set of switch-board terminals.

9. The combination of a series of figure keys, a series of electrically-selected adding wheels, an electrical controller coöperative with each of said keys and having a plurality of contacts, a switch-board having two sets of terminals, one set connected electrically with the adding wheels and the other set with said controller contacts, and a multipole switch for connecting different groups of one set of switch-board terminals with the other set of switch-board terminals.

10. The combination of a series of figure keys; a series of electrically-selected adding wheels; an electrical controller coöperative with each of said keys and having a plurality of contacts; and a switch-board having two sets of terminals, one set connected electrically with the adding wheels and the other set with said controller contacts, one of said sets of terminals being divided into a plurality of wheel-selecting groups selectively connectible in circuit with the other set, said groups being connected for selecting said wheels differentially.

11. The combination of a series of figure keys, a series of electrically-selected adding wheels, and an electrical controller coöperative with each of said keys and having a plurality of contacts controlling said adding wheels selectively, and differing in number from said adding wheels.

12. The combination of a series of figure keys, a series of electrically-selected adding wheels, an electrical controller coöperative with each of said keys and having a plurality of contacts controlling said adding wheels selectively and greater in number than said adding wheels, and means for electrically connecting with said adding wheels any series less than all of said contacts.

13. The combination of a series of figure keys, a series of electrically-selected adding wheels, an electrical controller coöperative with each of said keys and having a plurality of contacts controlling said adding wheels selectively and greater in number than said adding wheels, and a switch-board for electrically connecting with said adding wheels any series less than all of said contacts.

14. The combination of a series of figure keys, a series of electrically-selected adding wheels, an electrical controller coöperative with each of said keys and having a plurality of contacts greater in number than said adding wheels, and a switch-board having one group of terminals connected respectively with said adding wheels, a plurality of groups of terminals each of which groups is connected with a different series containing less than the whole number of said controller contacts, and means for connecting said first group of terminals with any of said other groups.

15. The combination of a series of figure keys, a series of electrically-selected adding wheels, an electrical controller having a plurality of contacts and coöperative with each of said keys and having a plurality of contacts greater in number than said adding wheels; and a switch-board having one group of terminals connected respectively with said adding wheels, a plurality of groups of terminals connected with said controller each of which groups is connected with a different series of contacts containing less than the whole number of said controller contacts, and a multipole switch for connecting the terminals of said first group with those of any other group.

16. The combination of a series of figure keys, a series of electrically-selected adding wheels, an electrical controller coöperative with each of said keys and having a plurality of contacts, and a multipole switch shiftable to different positions for connecting different groups of said contacts with said adding wheels.

17. The combination of a series of figure keys, a series of electrically-selected adding wheels, an electrical controller coöperative with each of said keys and having a plurality of contacts, a multipole switch shiftable to different positions for connecting different groups of said contacts with said adding wheels, and a switch-holding device for holding said switch in any one of said positions.

18. The combination of a series of figure keys, a series of electrically-selected adding wheels, an electrical controller coöperative with each of said keys and having a plurality of contacts, a switch-board having two sets of terminals, one set connected electrically with the adding wheels and the other set with said controller contacts, a multipole switch shiftable to different positions for connecting different groups of one set of switch-board terminals with the other set of switch-board terminals, and a switch-holding device for holding said switch in any one of said positions.

19. The combination of a series of figure keys; a series of electrically-selected adding wheels; an electrical controller coöperative with each of said keys and having a plurality of contacts greater in number than said adding wheels; and a switch-board having one group of terminals connected respectively with said adding wheels, a plurality of groups of terminals each of which groups is connected with a different series of contacts containing less than the whole number of said controller contacts, and a mutipole sliding switch having a plurality of contacts for connecting the terminals of said first group with those of any other group.

20. The combination of a series of figure keys; a series of electrically-selected adding wheels; an electrical controller coöperative with each of said keys and having a plurality of contacts greater in number than said adding wheels; and a switch-board having one group of terminals connected respectively with said adding wheels; a plurality of groups of terminals each of which groups is connected with a different series of controller contacts containing less than the whole number of said controller contacts, a guide, and a multipole sliding switch movable along said guide and having a plurality of contacts for connecting the terminals of said first group with those of any other group.

21. The combination of a series of figure keys; a series of electrically-selected adding wheels; an electrical controller coöperative with each of said keys and having a plurality of contacts greater in number than said adding wheels; and a switch-board having one group of terminals connected respectively with said adding wheels, a plurality of groups of terminals each of which groups is connected with a different series of controller contacts containing less than the whole number of said controller contacts, a guide having a series of holding faces one for each of the groups of terminals connected with the controller contacts, a multipole sliding switch movable along said guide and having a plurality of contacts for connecting the terminals of said first group with those of any other group, and a detent carried by said switch for engaging said holding faces selectively.

22. The combination of a series of figure keys, a series of electrically-selected adding wheels, an electrical controller coöperative with each of said keys and having a plurality of contacts, a plurality of rows of adding-wheel terminals the terminals of each row being electrically connected with each other and with an adding wheel, a plurality of corresponding rows of controller terminals the terminals in some of which rows are connected with different controller contacts, and means for connecting corresponding adding-wheel terminals and controller terminals.

23. The combination of a series of figure keys, a series of electrically-selected adding wheels, an electrical controller coöperative with each of said keys and having a plurality of contacts, a plurality of rows of adding-wheel terminals the terminals of each row being electrically connected with each other and with an adding wheel, a plurality of corresponding rows of controller terminals alternating with said rows of adding-wheel terminals the controller terminals in some of said rows being connected with different controller contacts, and means for connecting corresponding adding-wheel terminals and controller terminals.

24. The combination of a series of figure keys, a series of electrically-selected adding wheels, an electrical controller coöperative with each of said keys and having a plurality of contacts, a plurality of rows of adding-wheel terminals the terminals of each row being electrically connected with each other and with an adding wheel, a plurality of corresponding rows of controller terminals the terminals in some of which rows are connected with different controller contacts, and a switch having a plurality of contact arms adapted respectively for connecting corresponding adding-wheel terminals and controller terminals.

25. The combination of a series of figure keys, a series of electrically-selected adding wheels, an electrical controller coöperative with each of said keys and having a plurality of contacts, a plurality of rows of adding-wheel terminals the terminals of each row being electrically connected with each other and with an adding wheel, a plurality of corresponding rows of controller terminals alternating with said rows of adding-wheel terminals, the controller terminals in some of said rows being connected with different controller contacts, and a switch having a row of pairs of contact arms spanning all of said rows of terminals each pair of contact arms being positioned and adapted to connect corresponding adding-wheel and controller terminals of adjacent rows.

26. The combination of a series of figure keys, a series of adding wheels, electric circuits having electro-magnetic wheel-selecting means and electro-magnetic wheel-rotation-limiting means therein and also including an independent electro-magnet, and adding-wheel-actuating means controlled by said independent electro-magnet, said independent electro-magnet being, at a key depression, in circuit with said wheel-selecting and rotation-limiting means.

27. The combination of a series of figure keys, a series of adding wheels, electric circuits, and wheel-driving means, said electric circuits including a plurality of electro-magnetic wheel-selecting devices, electro-magnetic wheel-rotation-limiting means and an independent electro-magnet, and said wheel driving means being controlled by said independent electro-magnet.

28. The combination of a series of figure keys, a series of adding wheels, electric circuits having a plurality of wheel-selecting parallel branches and also including an electro-magnet controlled by each of said branch circuits, adding-wheel-actuating means controlled by said electro-magnet and including a motor, and electro-magnetic stop devices for limiting the rotation of said wheel.

29. The combination of a series of figure keys, a series of electrically-selected adding wheels, an actuating shaft, and an electric circuit having wheel selecting and coupling means for selecting said adding wheels and coupling them with said shaft.

30. The combination of a series of figure keys, a series of electrically-selected adding wheels each having one member of a clutch, a rotary actuator carrying the other members of all of said clutches, and electric circuits having selecting means for bringing complementary clutch members selectively into engagement.

31. The combination of a series of figure keys, a series of electrically-selected adding wheels, a rotary actuator co-axial with said adding wheels, electric circuits having wheel selecting and coupling means for coupling said adding wheels selectively with said actuator, and means for uncoupling and releasing them from the actuator.

32. The combination of a series of figure keys; a series of adding wheels; adding-wheel-actuating means including a motor; and electric circuits including wheel-selecting devices, stroke determining devices and an independent electro-magnet; said stroke determining devices being connected in series multiple with said wheel-selecting devices and said independent electro-magnet controlling the action of said wheel-actuating means.

33. The combination with a series of figure keys, of a series of electrically-selected adding wheels, a wheel-selecting electrical controller coöperative with each of said keys and having an element movable step-by-step, and a switch for varying the circuits through said controller.

34. The combination with a typewriter having a series of figure keys and a carriage, of a series of electrically-selected adding wheels, a wheel-selecting electrical controller coöperative also with each of said keys one element of which controller is movable with the typewriter carriage, and means between the controller and the adding wheels for changing the circuits.

35. The combination with a typewriter having a series of figure keys and a carriage, of a series of electrically-selected adding wheels, and an electric circuit including the following devices connected in series multiple, viz:—a wheel-selecting electrical controller coöperative with each of said keys and one element of which is movable with the typewriter carriage, stroke-determining means, a switch-board for changing the series-multiple connections between said controller and the adding wheels, and an electro-magnet controlling the movements of all of said adding wheels.

36. The combination with a typewriter having a series of figure keys, of a series of electrically-selected adding wheels, and an electric circuit including in a normally open parallel branch adding-wheel-actuating means and also including the following devices connected in series multiple, viz:—a wheel-selecting electrical controller coöperative with each of said keys and one element of which is movable with the typewriter carriage, stroke-determining means, means for varying the connections between said controller and the adding wheels, and an electro-magnet controlling said first-mentioned branch circuit.

37. The combination with a series of figure keys and with a universal-bar controlled by said keys, of a series of electrically-selected adding wheels, and a wheel-selecting electric circuit having therein a key-operated circuit-controller and a universal-bar-operated circuit-controller.

38. The combination of figure keys, a typewriter carriage, an electrical controller comprising a plurality of contact points and controlled by the movements of the carriage, a plurality of adding wheels, electrical connections from said adding wheels to said contact points, and means for varying the connections so that each of certain of the contact points may control different adding wheels of the series, whereby provision is made for variably spacing the column of figures.

39. The combination with a typewriter having a carriage and a series of figure keys, of a series of adding wheels, a step-by-step controlling device governed by the movements of said carriage, a plurality of controlling points governing said adding wheels selectively, and means for variably connecting said controlling points with said adding wheels.

40. The combination with a typewriter having a carriage and a series of figure keys, of a series of electrically-selected adding wheels, a step-by-step electrical controlling finger governed by the movements of said carriage, a plurality of controlling points on the framework of the machine, and controlling said wheels selectively, and means for varying the connections between said controlling points and the adding wheels.

41. The combination with a typewriter having a carriage and with letter keys and figure keys controlling the letter space movements of said carriage, of a series of adding wheels coöperative with said figure keys only, a step-by-step controlling device governed by the movements of said carriage and having a plurality of controlling points governing said adding wheels selectively, and means between the contact points and the wheels for variably connecting said controlling points with different adding wheels.

42. The combination with a typewriter having a carriage and a series of figure keys, of a series of electrically-selected adding wheels, a step-by-step electrical controller governed by the movements of said carriage and controlling said wheels selectively, and a switch-board having a plurality of separately-effective groups of connecting devices each group serving to connect a different series of controlling contacts with the adding wheels some of said controller contacts being disconnected from some of said groups.

43. The combination of a series of adding wheels, each having one member of a clutch; a shaft passing through said wheels and having the other members of all of said clutches; selecting means for bringing complementary clutch members into engagement; and carrying mechanism for transferring from one adding wheel to another.

44. The combination of a series of adding wheels, each having one member of a clutch; a complementary member for each clutch; selecting means for bringing the members of the several clutches selectively into engagement; and printing mechanism controlling said selecting means.

45. The combination of a series of adding wheels each having one member of a clutch and each movable also in the direction of its axis, carrying devices between said wheels actuating means, and wheel-shifting selecting means for shifting any of said clutch members into engagement with said actuating means.

46. The combination of a series of adding wheels each having one member of a clutch and each movable also in the direction of its axis, carrying devices between said wheels a rotary actuator carrying the other members of all of said clutches, and selecting means for shifting any of said clutch members into engagement with said actuating means.

47. The combination of an adding wheel movable in the direction of its axis and having one member of a clutch, a rotary actuator carrying the other member of said clutch, and an electromagnetic shipping device for shifting said wheel and its clutch member into engagement with said actuator and its clutch member.

48. The combination of an adding wheel movable in the direction of its axis and having one member of a clutch, a rotary actuator carrying the other member of said clutch, an electromagnetic shipping device for shifting said wheel and its clutch member into engagement with said actuator and its clutch member, and means for adjusting said electromagnet to vary the stroke of said shipping device.

49. The combination of an adding wheel movable in the direction of its axis and having one member of a clutch, a rotary actuator carrying the other member of said clutch, and an electromagnetic shipping device for shifting said wheel and its clutch member into engagement with said actuator and its clutch member, said device embodying a pivoted armature having a shipping lever connected thereto.

50. The combination of a series of adding wheels each having one member of a clutch and each movable also in the direction of its axis, a shaft carrying the other members of all of said clutches, a series of electromagnets, one for each adding wheel, a series of pivoted armatures one for each electromagnet, a suitably supported rod, a series of clutch-shipping arms secured respectively to said armatures, and a series of springs on said rod for returning said clutch-shipping arms and said adding wheels.

51. The combination of a series of figure keys, a series of adding wheels each having one member of a clutch, a rotary actuator carrying the other members of all of said clutches, a support, a series of adjusting nuts threaded into said support, a series of electromagnets secured respectively to said adjusting nuts, and a series of shipping arms controlled respectively by said electromagnets for bringing complementary clutch members selectively into engagement.

52. The combination with an adding wheel having one member of a clutch, of a bearing for said adding wheel, a rotary actuator carrying the other member of said clutch and passing through said bearing without touching the same, and means for bringing said clutch members into engagement.

53. The combination of an actuating shaft mounted in suitable bearings, a series of independently supported hubs surrounding said shaft and having bores of greater diameter than said shaft, a series of adding wheels mounted to turn and slide on said hubs and carrying each one member of a clutch, and a series of coöperating clutch members carried by said shaft.

54. The combination of a series of adding wheels suitably supported to rotate and to move axially and each carrying one member of a clutch, a shaft carrying all of the other members of the clutches and supported independently of said adding wheels, a series of shipping arms adapted to move the adding wheels and their clutch members into coöperative engagement with the clutch members on the shaft, a series of electromagnetic devices for moving said shipping arms in one direction to cause the coupling of said clutch devices and a series of springs for moving said shipping arms in the opposite direction to uncouple said clutching devices.

55. The combination of a series of finger keys, a series of adding wheels controlled by said keys, means for selecting one of said wheels by a relative motion of said wheel and the remaining wheels, and means for imparting an adding movement to the selected wheel.

56. The combination of a series of finger keys; a printing mechanism; a series of adding wheels; means controlled by said printing mechanism to impart a selecting movement to one of said wheels; and means controlled by said keys to impart an adding movement to the selected wheel.

57. The combination of a series of figure keys, a series of adding wheels, a shaft common to all of said wheels for turning the same, a variable-stroke shaft rotating actuator, and a series of key-controlled independent power-operated devices coöperative with said actuator for limiting the respective movements thereof.

58. The combination of a series of figure keys, an adding wheel, a variable-stroke rack having a plunger, a wheel-actuating shaft geared to said rack, a guide having a transverse bore, and a series of stops working in said guide and having openings adapted to register with said bore to permit said plunger to pass therethrough.

59. The combination of a series of figure keys, an adding wheel having one member of a clutch, a variable-stroke rack having a plunger, a wheel-actuating shaft geared to said rack and carrying the other member of said clutch, a guide having a transverse bore, a series of stops working in said guide and having openings adapted to register with said bore to permit said plunger to pass therethrough, and means for bringing said clutch members into engagement.

60. The combination of a series of figure keys, a series of adding wheels, a shaft common to all of said wheels for turning the same, a variable-stroke shaft rotating actuator, a series of key-controlled electromagnets, and a series of stops connected respectively with the armatures of said electromagnets and shiftable for limiting the respective movements of said actuator, and, through said actuator, of said shaft and adding wheels.

61. The combination of a series of figure keys, a series of adding wheels, a shaft common to all of said wheels for turning the same, a variable-stroke shaft rotating actuator, a series of key-controlled electrically-operated devices for limiting the respective movements of said actuator and, through said actuator, of said shaft and adding wheels, and key-controlled means for selectively coupling said adding wheels to said shaft.

62. The combination of a series of figure keys, a series of adding wheels, a shaft common to all of said wheels for turning the same, an electromotive variable-stroke shaft-rotating actuator, a series of key-controlled electrically-operated devices for limiting the respective movements of said actuator and, through said actuator, of said shaft and adding wheels, and key-controlled means for selectively coupling said adding wheels to said shaft.

63. The combination of a shaft, a series of adding wheels, a lever having a rack in mesh with a pinion on said shaft, and an electromagnet connected to said lever to cause a vibration thereof and a rotation of said shaft.

64. The combination of a shaft, a series of adding wheels, a lever having a rack in mesh with a pinion on said shaft, an electromagnet, a bell-crank and a link connecting the said bell-crank to said lever, a plunger attached to said lever, a series of stops adapted to variably arrest said plunger, lever, shaft and adding wheel.

65. The combination with an adding wheel having a series of laterally projecting stops, of a differential mechanism for rotating said adding wheel; a spring-pressed back-lash pawl, normally projecting into the path of said stops and co-acting therewith to positively arrest and limit the backward movement of said adding wheel; and a pawl, spring pressed against one of said stops, thereby moving said wheel backwardly on an over-rotation to bring one of said stops into engagement with said back-lash pawl.

66. The combination with a typewriter having a series of figure keys and also having a tabulating device, of a series of adding wheels, an electrical controlling device coöperative with said keys and with said tabulating device and having a plurality of controlling points governing said adding wheels selectively.

67. The combination with a typewriter having a series of figure keys and also having a tabulating device, of a series of adding wheels, an electrical controlling device coöperative with said keys and with said tabulating device and having a plurality of controlling points governing said adding wheels selectively, and changeable connections between said controlling points and said adding wheels.

68. The combination with a typewriter having a series of figure keys and also having a tabulating device, of a series of electrically-selected adding wheels, and an electrical controller coöperative with each of said keys and with said tabulating device and controlling said wheels selectively.

69. The combination with a typewriter having a series of figure keys, a column gage bar, a tabulating device co-acting with said column gage bar, and a second column gage bar, of a series of adding wheels, and an electrical controlling device governed by said keys and coöperative with said second column gage and with the tabulating device and having a plurality of controlling points governing said adding wheels selectively.

70. The combination with a typewriter having a series of figure keys, a column gage bar, and a tabulating device co-acting with said column gage bar, of a series of electrically-selected adding wheels, and an electrical controller having a contact secured to the typewriter carriage and also having a series of relatively fixed complementary contacts controlling said wheels selectively.

71. The combination with a typewriter having a series of figure keys, a carriage, and a tabulating device controlling the tabulating movements of said carriage, of a series of adding wheels, and a controlling device settable to different working positions and adapted to be brought into operation by the tabulating device and having a plurality of controlling points governing said adding wheels selectively.

72. The combination with a typewriter having a series of figure keys, a carriage, a column gage bar, a tabulating device coöperative with said column gage bar and controlling the tabulating movements of said carriage, and a second column gage bar disposed reversely to the first, of a series of adding wheels, and a controlling device coöperative with said second column gage bar and settable to different working positions and adapted to be brought into operation by the tabulating device and having a plurality of controlling points governing said adding wheels selectively.

73. The combination with a typewriter having a series of figure keys, a carriage, a column gage bar movable with the carriage, a tabulating device coöperative with said column gage bar and controlling the tabulating movements of said carriage, and a fixed column gage bar disposed reversely to the first, of a series of adding wheels, and an electrical controller having a contact movable with the carriage and governed by the tabulating device and also having a series of complementary contacts settable along said fixed column gage bar to different working positions and controlling said adding wheels selectively.

74. The combination with an actuator and with an adding wheel normally disconnected therefrom, of coupling means and a resetting mechanism successively operative for first coupling said wheel and actuator and then turning said adding wheel through said actuator to the zero position.

75. The combination with an actuator and with an adding wheel normally disconnected therefrom, of coupling, rotating and uncoupling devices successively operative in the order named for first coupling said wheel and actuator, then turning said wheel to its zero position, and then uncoupling said actuator and wheel.

76. The combination with a series of adding wheels and with an actuator common thereto but normally disconnected therefrom, of coupling, rotating and uncoupling devices successively operative in the order named for first coupling to said actuator all wheels not in their zero positions, then turning through said actuator all of said coupled wheels to their zero position, and then uncoupling said actuator and wheels.

77. The combination with an adding wheel, and a rotary actuator from which the adding wheel is normally disengaged and which is effective to turn the adding wheel to set up the desired number thereon and to turn the wheel to the zero position, of the following devices successively effective in the order named, viz., coupling means, a rotating device, and a quick-let-off uncoupling device effective when the adding wheel reaches its zero position.

78. The combination with an actuator and with an adding wheel normally disconnected therefrom and having an opening therein, of coupling means having a wheel-shifting coupling member in the circuit of movement of said opening, a rotating device for turning said adding wheel to its zero position, and uncoupling means operative on the registration of said coupling member with said opening.

79. The combination with an actuator and with an adding wheel normally disconnected therefrom and having an opening therein, of coupling means having a wheel-shifting coupling member in the circuit of movement of said opening, a rotating device for turning said adding wheel to its zero position, and an uncoupling spring-acted device operative on the registration of said coupling member with said opening.

80. The combination with an actuator and with an adding wheel normally disconnected therefrom and having an opening therein, of a coupling slide having thereon a wheel-shifting coupling member in the circuit of movement of said opening, a rotating device for turning said adding wheel to its zero position, and uncoupling means operative on the registration of said coupling member with said opening.

81. The combination with a rotary actuator having one member of a clutch, of an adding wheel normally disconnected from said actuator and having a complementary clutch member, means for imparting adding movements to said actuator, means for imparting a resetting movement to said actuator, and separately operative devices for coupling and uncoupling said clutch members and causing all of the wheels to be reset to zero position.

82. The combination with an actuator and with an adding wheel normally disconnected therefrom, of a resetting shaft, and the following devices controlled by the turning of said shaft and successively effective in the order named, viz., coupling means for effecting a connection between the adding wheel and actuator, means for turning the actuator to rotate the wheel to zero position, and a device for automatically uncoupling said wheel when it reaches its zero position.

83. The combination with an actuator and with an adding wheel normally disconnected therefrom, of a resetting shaft having a pair of cams, and the following devices controlled by the turning of said shaft and successively effective in the order named, viz., coupling means co-acting with one of said cams, a rotating device co-acting with the other of said cams, and an uncoupling device effective when the adding wheel reaches its zero position.

84. The combination with an actuator and with an adding wheel normally disconnected therefrom, of a resetting shaft having a pair of cams, a pair of levers co-acting respectively with said cams, and the following devices controlled by the turning of said shaft and successively effective in the order named, viz., coupling means co-acting with one of said levers, a rotating device co-acting with the other of said levers, and an uncoupling device effective when the adding wheel reaches its zero position.

85. The combination with an actuator and with an adding wheel normally disconnected therefrom, of a resetting shaft, means for limiting the movements of said shaft, and the following devices controlled by the turning of said shaft and successively effective in the order named, viz., coupling means, a rotating device, and an uncoupling device effective when the adding wheel reaches its zero position.

86. The combination with an actuator and with an adding wheel normally disconnected therefrom, of a resetting shaft, a clutch controlled by said resetting shaft, and means also controlled by said shaft for imparting a quick uncoupling movement to said clutch when the adding wheel reaches its zero position.

87. The combination with an actuator and with an adding wheel normally disconnected therefrom, of a resetting shaft, and the following devices controlled by the turning of said shaft and successively effective in the order named, viz., a clutch, a rotating device, and means for imparting a quick uncoupling movement to said clutch when the adding wheel reaches its zero position.

88. The combination with an actuator and with an adding wheel normally disconnected therefrom, of a resetting shaft, and the following devices controlled by the turning of said shaft and successively effective in the order named, viz., a clutch, a resetting device, and a quick acting uncoupling device effective when the adding wheel reaches its zero position.

89. The combination with a series of adding wheels and with actuating means normally disconnected therefrom for turning said wheels to add, of coupling means and resetting means successively operative for first coupling to said actuating means all wheels not in their zero positions and then through said actuating means turning all of said coupled wheels to their zero positions.

90. The combination with a series of adding wheels each having one member of a clutch and with an actuator common thereto and normally disconnected therefrom having all the other members of said clutches, of coupling means and resetting means successively operative for first coupling to said actuator all wheels not in their zero positions and then turning all of said coupled wheels to their zero positions.

91. The combination with a series of adding wheels each having one member of a clutch and with an actuator common thereto and normally disconnected therefrom having all the other members of said clutches, of coupling means including a series of coupling members one for each wheel and operative for coupling to said actuator all wheels not in their zero positions, and a rotating device operative after the coupling of said parts for turning all of said coupled wheels to their zero positions.

92. The combination with a series of adding wheels each having one member of a clutch and with an actuator common thereto and normally disconnected therefrom having all the other members of said clutches, of a slide having a series of coupling members one for each wheel and operative for coupling to said actuator all wheels not in their zero positions, and a rotating device operative on the coupling of said parts for turning all of said wheels to their zero positions.

93. The combination with a series of adding wheels each having one member of a clutch and with an actuator common thereto and normally disconnected therefrom having all the other members of said clutches, of a resetting shaft, a spring-retracted slide having a series of coupling members one for each wheel and operable from said shaft for coupling to said actuator all wheels not in their zero positions, and means controlled by said resetting shaft and operative after the coupling of said parts for turning all of said wheels to their zero positions.

94. The combination with a pair of adding wheels and with an actuator co-acting with but normally disconnected therefrom, of a carrying device adapted to actuate the second adding wheel, means for coupling said wheels to said actuator, means coöperative with said actuator to reset said wheels to zero position, and a blocking device for holding said carrying device out of operative relation with the second adding wheel during the resetting operation.

95. The combination with a pair of adding wheels and with an actuator co-acting with but normally disconnected therefrom, of a carrying device operated from a separate source of power and adapted to actuate the second adding wheel, means for coupling said wheels to said actuator, means coöperative with said actuator to reset said wheels to zero position, and a blocking device for holding said carrying device out of operative relation with the second adding wheel during the resetting operation.

96. The combination with a pair of adding wheels and with an actuator co-acting with but normally disconnected therefrom, of a carrying device adapted to actuate the second adding wheel, a resetting shaft, means controlled by said shaft for coupling said wheels to said actuator and for resetting said wheels, and a blocking device also controlled by said shaft for holding said carrying device out of operative relation with the second adding wheel during the resetting operation.

97. The combination with a series of adding wheels, of an actuator co-acting with but normally disconnected from said wheels, a series of separately-operative carrying devices, a series of separately-operative coupling devices one for each wheel and each adapted to couple its adding wheel with the actuator during adding operations, coupling means for coupling all of said wheels with said actuator, means for turning said actuator to bring all of said wheels to their zero positions, and a blocking bar common to all of said carrying devices and operative during the resetting operation for holding said carrying devices out of operative relation with the wheels driven thereby.

98. The combination with an actuator and with an adding wheel normally disconnected therefrom, of coupling means controlling the adding movements of said wheel by said actuator, and a separate coupling means controlling the resetting of said wheel by said actuator.

99. The combination with a series of adding wheels and with an actuator common thereto and normally disconnected therefrom, of a series of separately-operative coupling devices controlling the adding movements of said wheels and operative for coupling said actuator and said wheels selectively, coupling means controlling the resetting of said wheels operative for simultaneously coupling said actuator and all wheels not in their zero positions, and rotating means for turning all of said coupled wheels to their initial positions.

100. The combination of a series of figure keys, a series of adding wheels controlled by said keys, an actuator common to all of said wheels and normally disconnected therefrom, a series of separately-operative coupling devices controlling the adding movements of said wheels and operative for coupling said actuator and said wheels selectively, coupling means controlling the resetting of said wheels and operative for simultaneously coupling said actuator and all wheels not in their zero positions, and resetting means controlling the operation of said coupling means and operative for turning all of said coupled wheels to their zero positions.

101. The combination with a typewriter having a series of figure keys and a carriage, of a series of adding wheels, a controlling device coöperative with each of said keys and with the carriage and having a plurality of controlling points governing said adding wheels selectively, an actuator common to all of said wheels and normally disconnected therefrom, a series of separately-operative coupling devices controlling the adding movements of said wheels and operative for coupling said actuator and said wheels selectively, coupling means controlling the resetting of said wheels and operative for simultaneously coupling said actuator and all wheels not in their zero positions, and resetting means controlling the operation of said coupling means and operative for turning all of said coupled wheels to their zero positions.

102. The combination of a series of adding wheels, an actuator common thereto but normally disconnected therefrom, means acting during the adding operations for connecting said wheels to said actuator and for disconnecting the same therefrom, and a resetting mechanism for independently connecting said wheels to said actuator.

103. The combination of a series of adding wheels, a shaft common thereto but normally disconnected therefrom, a clutch member on each of said wheels, a set of clutch members on said shaft, means for selectively coupling said wheels with said shaft during the adding operations and for selectively uncoupling said wheels, means for turning said shaft during the adding operations and after said wheels have been selectively coupled to said shaft, and an independent means for simultaneously coupling all of said wheels not in their zero positions with said shaft and then for turning said shaft to carry all of such wheels around to their zero positions and maintaining them thereat.

104. In an adding machine and in a resetting mechanism therefor, the combination with the series of adding wheels, of means for rotating said adding wheels to add and which are likewise effective for picking up simultaneously all of the wheels which are to be reset to zero, and means for dropping them independently one at a time as they severally reach the zero position.

105. In an adding machine and in a resetting mechanism, the combination with the series of adding wheels and a shaft for rotating the same, of coupling devices whereby said wheels are engageable with and disengageable from said shaft, means for simultaneously moving all of said wheels longitudinally of said shaft to effect a coupling of said wheels with said shaft, means tending independently and automatically to uncouple said wheels from said shaft, means for rotating said shaft when said wheels have been coupled as aforesaid for causing all of said wheels to turn simultaneously, and means for permitting the uncoupling of said wheels as they severally arrive at zero position.

106. In an adding machine and in a resetting mechanism, the combination of a series of adding wheels having each a clutch member and an opening, a shaft for rotating said wheels and provided with a plurality of coacting clutch members, a series of pins movable in the direction of the length of said shaft and adapted by their contact with the bodies or webs of said wheels to move all of said wheels whose openings are not in register with their associated pins longitudinally of said shaft and to effect the coupling of said wheels with the latter, means for turning said shaft and said coupled wheels until their openings are caused to register with their associated pins, and means for uncoupling said wheels when such register occurs.

107. In an adding machine and in a resetting mechanism, the combination of a series of adding wheels having each a clutch member and an opening, a shaft for rotating said wheels and provided with a plurality of coacting clutch members, a series of pins for simultaneously coupling all of said wheels which are to be returned to zero through said shaft, and a series of independent uncoupling devices adapted to restore each wheel to an uncoupled condition when its opening is caused to aline or register with its associated pin.

108. In an adding machine and in a resetting mechanism, the combination of a series of adding wheels having each an opening, a driving shaft for said adding wheels, means for coupling said wheels to said shaft, a series of devices for simultaneously coupling all of the wheels which are to be reset to said shaft and adapted to co-act with said openings in said wheels, and means for uncoupling each wheel independently when each said opening has coöperated with its coacting device.

109. In an adding machine and in a resetting mechanism, the combination of a rotary of adding wheels having each an opening and a clutch member, a shaft having a series of co-acting clutch members, a series of laterally movable devices for clutching said wheels to their shaft and also for coöperating with said openings in said wheels, and a series of spring-pressed levers opposing said series of laterally movable clutching devices for independently unclutching said wheels as their openings severally register with the said laterally movable clutching devices.

110. In an adding machine and in a resetting mechanism, the combination of a rotatory shaft, a series of adding wheels, a series of clutching devices between said wheels and said shaft, a series of pins movable longitudinally of said shaft for simultaneously clutching all of said wheels which are to be reset to said shaft, a series of independently acting unclutching devices for restoring the said wheels to their normal unclutched positions as openings in said wheels register or aline with said pins, means for moving said pins to cause a clutching engagement of said wheels, means for turning said shaft and wheels when thus clutched, hand-controlled means for actuating both of said last-mentioned means, and means for restoring said pins and their actuating means and the said shaft actuating means to normal position when all of said wheels have been returned to zero.

111. In an adding machine and in a resetting mechanism, the combination with a series of adding wheels having each an opening and a clutch member, a shaft provided with a plurality of co-acting clutch members, a series of independently acting unclutching devices, a series of simultaneously acting clutching pins adapted to slide all of the wheels to be reset and also adapted to the openings in said wheels, a lever and a cam for moving said pins in one direction, springs for returning the same, a lever geared with said wheel rotating shaft, a cam for actuating said lever to turn the shaft and wheels, and spring mechanism for returning the cams to normal position.

112. In an adding machine, the combination of a rotatory shaft having a plurality of clutching devices, a series of adding wheels each provided with a co-acting clutching device, and means for sliding said wheels axially of their shaft to effect a clutching engagement therewith.

113. In an adding machine, the combination of a rotatory shaft, a series of laterally movable adding wheels, and clutching mechanism for connecting said adding wheels with said shaft.

114. In an adding machine, the combination of a rotatory shaft, a series of laterally movable adding wheels, means for connecting said wheels to said shaft as they are selectively moved laterally, and means for disconnecting said wheels from said shaft after said wheels have been rotated by the latter to a desired extent.

115. The combination of a rotatory shaft, a series of adding wheels surrounding said shaft and adapted to be connected thereto selectively, key - controlled mechanism for effecting such connections, key - controlled means for rotating said shaft when such connections have been made, and a series of independent automatically acting unclutching devices adapted to disconnect said wheels from said shaft when said wheels have been rotated by the latter to a desired extent.

116. In an adding machine, the combination of a series of adding devices, a controller having a plurality of contact devices, electrical connections between said adding devices and said contact devices, and means for changing the circuits so that some of the contact devices may control the selection of different adding devices for varying the spacing between orders.

117. In an adding machine, the combination of a series of adding wheels, means for rotating the same, stops for variably arresting said adding wheels, carrying devices for said adding wheels, a series of key - controlled electromagnets having devices for selectively connecting said adding wheels with their rotating means, a series of key-controlled electromagnets having devices for variably operating said stops, an electromagnet for retracting said carrying devices, and an electromagnet for operating said wheel rotating means; the combination and arrangement being such that when the key mechanism is actuated the electromagnet controlling the selected wheel is energized to connect such wheel with its rotating means and the electromagnet controlling the stop for governing the extent of rotation of said wheel is simultaneously energized to actuate such stop, while at the same time the electromagnet which acts to retract the said carrying devices is energized and all of the carrying devices are moved to operative positions, and such that after all of said electromagnets have been energized and have caused their connected devices to operate as described the said electromagnet for operating the wheel rotating means is then energized and the selected wheel is caused to rotate a distance determined by the previous setting of said stop.

118. The combination of a series of adding wheels, means for rotating the same, an electromagnet for operating said wheel rotating means, a series of electromagnets for selectively connecting said wheels with their rotating means, a series of electromagnets for controlling a series of stops for determining the extent of rotation of each wheel and an additional electromagnet in series with the wheel connecting electromagnets and the stop actuating electromagnets for operating a controller in the circuit in which the wheel rotating electromagnet is contained.

119. The combination with the paper carriage of a typewriting machine and the adding wheels of an adding machine, of an electrical controller governed by the movements of the said carriage and connected to a series of electromagnets which control selectively the said adding wheels, a series of stops for determining the extent of rotation of each adding wheel, a series of electromagnets for actuating said stops and controlled by key mechanism at the typewriter, an electromagnet connected with devices for rotating said adding wheels, and an additional electromagnet in circuit with the wheel selecting electromagnets and the wheel arresting electromagnets and connected with means for controlling the circuit in which is arranged the said electromagnet for rotating said adding wheels, the construction and arrangement being such that the last-mentioned electromagnet is prevented from acting until after the wheel selecting and wheel arresting devices have been actuated.

120. The combination of a series of figure keys, a series of electrically-selected adding wheels, an electrical controller coöperative with each of said keys and controlling said wheels selectively, means including a switch shiftable to different positions for varying the connections between the controller and the adding wheels, and indicating means including a pointer movable with said switch.

121. The combination of a series of figure keys, a series of electrically-selected adding wheels, an electrical controller coöperative with each of said keys and controlling said wheels selectively, a switch board having a plurality of groups of contacts for varying the connections between said controller and the adding wheels, a switch shiftable to any one of said groups, and indicating means including a fixed index plate and a pointer the latter movable with said switch.

122. The combination with a typewriter having a plurality of electric terminals, of an electrically controlled adding mechanism, and a detachable insulating plug having a plurality of terminals complementary to said terminals on the typewriter and controlling different portions of the adding mechanism.

123. The combination with a typewriter having a contact box with a series of electric terminals therein and a slot in one side thereof, of an electrically controlled adding mechanism, and a detachable insulating plug mounted in said slot and having a plurality of terminals complementary to said terminals on the typewriter and controlling different portions of the adding mechanism.

124. The combination with a typewriter having a contact box with a series of electric terminals therein and a slot in one side thereof, of an electrically controlled adding mechanism, a detachable insulating plug mounted in said slot and having a plurality of terminals complementary to said terminals on the typewriter and controlling different portions of the adding mechanism said plug also having an opening therein, and a locking pin adapted to pass into said opening in the insulating plug.

125. In a typewriting and adding machine, the combination with an electric circuit comprising a pair of electrical terminals one of which normally tends to make contact with the other, of a key normally holding such movable terminal out of contact with the other and adapted to release said terminal and calculating mechanism controlled by said electric circuit.

126. In a typewriting and adding machine, the combination with an electric circuit comprising a pair of electrical terminals one of which normally tends to make contact with the other, of a spring-pressed key normally holding such movable terminal out of contact with the other and adapted to release said terminal and calculating mechanism controlled by said electric current.

127. The combination of a series of figure keys a series of adding wheels each automatically rotatable different distances corresponding respectively to the figures represented by said keys, and the following devices operative from separate sources of power independent of that applied to the figure keys, viz., adding-wheel-actuating means for imparting units registering movements to said wheels, key-controlled automatically actuated stroke-determining devices for governing the extent of rotation of each wheel, and automatically actuated carrying devices adapted to impart a carrying movement to each wheel of a higher order on each complete rotation of the wheel of the next lower order.

128. The combination with a series of figure keys and with a series of adding wheels each automatically rotatable different distances corresponding respectively to the figures represented by said keys, of the following devices operative from separate sources of power and independent of that applied to the figure keys, viz., key-controlled wheel-selecting means, adding wheel actuating means for imparting units registering movements to said wheels, and carrying devices adapted to impart a carrying movement to each wheel of a higher order on each complete rotation of the wheel of the next lower order.

129. The combination with a series of figure keys and with a series of adding wheels each rotatable different distances corresponding respectively to the figures represented by said keys, of the following devices operative from separate sources of power and independent of that applied to the figure keys, viz., wheel-selecting means, adding-wheel-actuating means for imparting units registering movements to said wheels, stroke determining devices for governing the extent of rotation of each wheel, and carrying devices adapted to impart a carrying movement to each wheel of a higher order on each complete rotation of the wheel of the next lower order.

130. The combination with a series of figure keys, of an actuating shaft, a series of adding wheels each rotatable different distances corresponding respectively to the figures represented by said keys and movable longitudinally of said shaft, a pinion on said shaft, coupling means controlled by said keys for coupling said shaft and the adding wheels selectively, a rack in mesh with said pinion, and means for moving said rack different distances to rotate said shaft and wheels.

131. The combination with a series of figure keys, of a series of adding wheels each rotatable different distances corresponding respectively to the figures represented by said keys, an actuating shaft having thereon a pinion, coupling means controlled by said keys for coupling said shaft and the adding wheels selectively, a rack in mesh with said pinion, an electromagnet for imparting a working stroke to said rack, and a spring for imparting a return stroke to said rack.

132. The combination with a series of adding wheels of an actuator co-acting with but normally disconnected from said wheels, a series of carrying devices, a series of coupling devices, one for each wheel, means for coupling all of said wheels with said actuator, means for turning said actuator to bring all of said wheels to their zero positions, and a blocking bar common to all of said carrying devices and operative during the resetting operations for holding said carrying devices out of operative relation with the wheels driven thereby.

133. The combination with a series of adding wheels and with an actuator common thereto and normally disconnected therefrom, of coupling means controlling the resetting of said wheels operative for simultaneously coupling said actuator and all wheels not in their zero positions, and rotating means for turning all of said coupled wheels to their initial positions.

134. The combination of a series of figure keys, a series of adding wheels controlled by said keys, an actuator common to all of said wheels and normally disconnected therefrom, coupling means controlling the resetting of said wheels and operative for simultaneously coupling said actuator and all wheels not in their zero positions, and resetting means controlling the operation of said coupling means and operative for turning all of said coupled wheels to their zero positions.

135. In a combined key actuated typewriting and adding machine, the combination of a series of adding wheels controlled by the figure printing keys of said typewriting machine, carrying means for said adding wheels, and means common to and controlled by said figure printing keys for restoring the carrying means to normal position.

136. In a combined key actuated typewriting and adding machine, the combination of a series of adding wheels controlled by the figure printing keys of said typewriting machines, carrying devices for said adding wheels, and a frame common to all of said carrying devices and controlled by said figure printing keys for restoring all of said carrying devices to normal position.

137. In a combined key actuated typewriting and adding machine, the combination of a pair of electrically selected adding wheels which are controlled by printing keys of the machine, and each wheel being rotatable to different distances corresponding respectively to the figures represented by said keys, electrically operated means for rotating either of said adding wheels, and carrying devices free from frictional connection with said keys and operated from a source of power other than that which operates said first adding wheel and adapted to actuate the second adding wheel.

138. In a combined key-actuated typewriting and adding machine, the combination of a pair of adding wheels, means controlled by the printing keys of said machine for rotating one of said wheels, a carrying device adapted to actuate the second adding wheel, a spring, and an electro-magnet independent of said wheel rotating means and operative respectively for imparting working and return strokes to said carrying device.

139. In a combined key-actuated typewriting and adding machine, the combination of a pair of adding wheels, means controlled by printing keys of said machine for rotating one of said wheels, a carrying device for actuating the second adding wheel, separate means for imparting a return stroke to said carrying device and spring actuated trip mechanism for restoring said stroke returning means to normal position.

140. In a combined key-actuated typewriting and adding machine, the combination of a pair of adding wheels, means controlled by printing keys of said machine for rotating one of said wheels, a carrying device for actuating the second adding wheel, separate means for imparting a return stroke to said carrying device, spring actuated trip mechanism for restoring said stroke returning means to normal position, and means for determinating at what point said trip mechanism shall be operative.

141. In a combined key-actuated typewriting and adding machine, the combination of a pair of adding wheels, means controlled by printing keys of said machine for rotating one of said wheels, a carrying device for actuating the second adding wheel and electrically operated tripping means for imparting a return stroke to said carrying device.

142. In a combined-key-actuated typewriting and adding machine, the combination of a series of adding wheels controlled by the writing keys of said machine, a series of spring actuated carrying levers, a restoring bar common to all of said carrying levers, means for causing said bar to return all of said levers against the tension of their springs, and spring actuated trip mechanism for subsequently returning said restoring bar to normal position.

143. In a combined key actuated typewriting and adding machine, the combination of a series of adding wheels controlled by the writing keys of said machine, a series of carrying levers for said adding wheels, a series of springs for urging said carrying levers into coöperating engagement with said adding wheels, a series of detents for preventing the operations of said levers until the proper time, means on the adding wheels for releasing said detents, a restoring bar common to all of said levers, means for operating said bar to restore said levers to normal position against the tension of their springs and into reëngagement with their detents, and spring actuated tripping mechanism for subsequently returning said bar to its normal position.

144. In a combined key-actuated typewriting and adding machine, the combination of a pair of adding wheels, means controlled by the printing keys of said machine for rotating one of said wheels, a carrying device adapted to actuate the second adding wheel, an electro-magnet controlling one of the movements of said carrying device, and an electric circuit including a controller operated by said magnet and governing the operation of said wheel rotating means.

145. In a combined key-actuated typewriting and adding machine, the combination of a series of adding wheels controlled by the printing keys of said machine, a series of carrying devices for the wheels, a spring returned rocker frame common to all of said carrying devices for restoring them to normal position, a hook for actuating said rocker frame, and means for causing said hook to be disengaged from said rocker frame.

146. In a combined key-actuated typewriting and adding machine, the combination of a series of adding wheels controlled by the printing keys of said machine, a series of carrying devices therefor, a spring returned rocker frame common to all of said carrying levers for restoring them to normal position, a hook for actuating said rocker frame, an electro-magnet for operating said hook, means for detaching said hook from said rocker frame, electric circuit controlling means for turning said adding wheels, and a circuit controlling device actuated by said magnet for effecting a rotative movement of one of said adding wheels after the said carrying devices have been restored to normal position.

147. In a combined key-actuated typewriting and adding machine, the combination of a series of adding wheels controlled by the printing keys of said machine, means for rotating said adding wheels, a series of spring actuated carrying levers therefor, a series of detents for said levers actuated by said wheels, a spring returned rocker frame common to all of said levers, a spring pressed hook detachably connected with said rocker frame, a spring returned lever for actuating said hook, an electro-magnet for actuating said lever, a detaching device for said hook, an electric circuit connected with said wheel rotating means, and a circuit controller therefor controlled by the operation of said magnet.

148. The combination with adding mechanism, of figure keys therefor, and controlling devices that are supported against actuation by the figure keys and affording an actuation of the adding mechanism by an independent power when the keys are operated.

149. The combination with adding mechanism, of figure keys therefor, and independently operable spring pressed controlling devices, one for each of said figure keys and which exert a pressure in opposition to the power employed to maintain the figure keys in their normal positions, said devices being normally supported against actuation by the figure keys and affording an actuation of the adding mechanism by said spring pressure when the keys are operated.

150. The combination of key actuated writing mechanism, adding mechanism, and means which are supported by the figure keys of the writing mechanism for maintaining the adding mechanism inoperative.

151. The combination of key actuated writing mechanism, adding mechanism, and controlling means which are normally maintained by the figure keys of the writing mechanism against an actuation by an independent power and which afford an operation of the adding mechanism when any one of said figure keys is actuated.

152. The combination of key actuated writing mechanism, adding mechanism, independently operable controlling devices, each of which is supported by a figure key of the writing mechanism, each device being adapted to operate on the actuation of its figure key by a power independent of that applied to the figure key, to effect an operation of the adding machine.

153. The combination of key actuated writing mechanism, adding mechanism, independently operable spring pressed controlling devices, each of which is supported by a figure key of the writing mechanism and the tension of which is exerted in the direction of the movement of the associated key from the normal position, each device being adapted to operate by its spring power on the actuation of its figure key to effect an operation of the adding machine.

154. The combination of a series of adding wheels; means for actuating the same; a selecting device having a series of controlling points governing said adding wheels selectively; and connections between said controlling points and said wheels, said connection being arranged to be changed by the operator.

155. The combination of printing means; a carriage; a series of adding wheels; a selective device coöperating with the carriage to select an adding wheel according to the position of the carriage; and a member adjustable to different positions to vary the connections between the selective device and the several adding wheels.

156. The combination of a series of adding wheels; a controlling device having a plurality of controlling points governing said adding wheels for the purpose of selecting the adding wheel to be operated; said controlling points differing in number from said adding wheels.

157. The combination of a series of adding wheels; a controlling device having a plurality of controlling points governing said adding wheels for the purpose of selecting the adding wheel to be operated; said controlling points differing in number from said adding wheels, and changeable connections between said controlling points and said adding wheels.

158. The combination of a series of adding wheels; a controlling device having a plurality of controlling points governing said adding wheels and greater in number than said adding wheels, and a punctuation connector system between said controlling points and said adding wheels for connecting with said adding wheels any series of points less than all of said controlling points.

159. The combination of a series of electrically selected adding wheels; an electrical controller controlling said adding wheels selectively; and a switch-board for varying the connections between said controller and the adding wheels.

160. The combination of a series of electrically selected adding wheels, an electrical controller controlling said wheels selectively; and a multi-pole switch controlling a plurality of connections between said controller and the adding wheels.

161. The combination of a series of electrically selected adding wheels, an electrical controller controlling said wheels selectively, a plurality of groups of connections between said controller and the adding wheels, and a multi-pole switch controlling said groups selectively.

162. The combination of a series of electrically selected adding wheels, an electrical controller having a plurality of contacts, a switch-board having two sets of terminals, one set connected electrically with the adding wheels, and the other set with said controller contacts, and means for connecting different groups of one set of switch-board terminals with the other set of switch-board terminals.

163. The combination of a series of electrically selected adding wheels, an electrical controller having a plurality of contacts, a switch-board having two sets of terminals, one set connected electrically with the adding wheels and the other set with said controller contacts, and a multi-pole switch for connecting different groups of one set of switch-board terminals with the other set of switch-board terminals.

164. The combination of a series of electrically selected adding wheels, an electrical controller having a plurality of contacts, and a switch-board having two sets of terminals, one set connected electrically with the adding wheels and the other set with said controller contacts, one of said sets of terminals being provided into a plurality of wheel selecting groups selectively connectable in circuit with the other set, said groups being connected for selecting said wheels differentially.

165. The combination of a series of electrically selected adding wheels, an electrical controller having a plurality of contacts controlling said adding wheels selectively and differing in number from said adding wheels.

166. The combination of a series of electrically selected adding wheels, an electrical controller having a plurality of contacts controlling said adding wheels selectively and greater in number than said adding wheels, and means for electrically connecting with said adding wheels any series less than all of said contacts.

167. The combination of a series of electrically selected adding wheels, an electrical controller having a plurality of contacts controlling said adding wheels selectively and greater in number than said adding wheels, and a switch-board for electrically connecting with said adding wheels any series less than all of said contacts.

168. The combination of a series of electrically selected adding wheels, an electrical controller having a plurality of contacts greater in number than said adding wheels and a switch-board having one group of terminals connected respectively with said adding wheels, a plurality of groups of terminals, each of which groups is connected with a different series containing less than the whole number of said controller contacts, and means for connecting said first group of terminals with any of said other groups.

169. The combination of a series of electrically selected adding wheels, an electrical controller having a plurality of contacts greater in number than said adding wheels, and a switch-board having one group of terminals connected respectively with said adding wheels, a plurality of groups of terminals connected with said controller, each of which groups is connected with a different series of contacts containing less than the whole number of said controller contacts and a multi-pole switch for connecting the terminals of said first group with those of any other group.

170. The combination of a series of electrically selected adding wheels; an electrical controller having a plurality of contacts, and a multi-pole switch shiftable to different positions for connecting different groups of said contacts with said adding wheels.

171. A typewriting mechanism comprising a movable carriage; a series of adding wheels; actuating means adapted to rotate said wheels to add; and means controlled by said carriage to move one of said wheels relatively to the others to connect the same with said actuating means.

172. The combination with a typewriter having a carriage movable to different positions, of an adding machine having a series of adding wheels; means for operating said wheels; selective means mounted on the typewriter and controlled by the position of the carriage for determining which wheel shall be operated; and means in the adding machine adjustable at will to change the action of the selective means.

173. The combination of means for printing numbers in denominational positions; a series of adding wheels, one for each denomination, means for operating said wheels to add upon each numbers printed in the corresponding denominational position; and a handle and connections adjustable at will to vary the denominational positions corresponding to the several wheels.

174. A series of keys; a series of electric circuits, one for each key, each of said circuits having a circuit controller controlled by its key individually, and all of said circuits having a conductor in common; a circuit controller in said common conductor, controlled by any of said keys; and adding mechanism controlled by said electric circuits.

175. A series of keys; a series of electric circuits, one for each key, each of said circuits having a circuit controller controlled by its key individually and all of said circuits having a conductor in common; a circuit controller in said common conductor; a universal member controlled by any of said keys and operating to open said common circuit controller before the individual circuit controller is opened by its key; and adding mechanism controlled by said electric circuits.

176. In an adding device, the combination of a series of adding wheels, a series of keys controlling said wheels, carrying devices for said adding wheels, and a frame common to all of said carrying devices and controlled by said keys for restoring said carrying devices to normal position.

177. In an adding device, the combination of a pair of adding wheels, a series of keys controlling the first of said wheels, a carrying device adapted to actuate the second adding wheel, a spring and an electromagnet independent of said wheel rotating means and operative respectively for imparting working and return strokes to said carrying device.

178. In an adding device, the combination of a pair of adding wheels, a series of keys, means controlled by said keys for rotating one of said wheels, a carrying device for actuating the second of said wheels, separate means for imparting a return stroke to said carrying device, a spring actuated trip mechanism for restoring said returning means to normal position.

179. In an adding device, the combination of a pair of adding wheels, a series of keys, means controlled by said keys for rotating one of said wheels, a carrying device for actuating the second of said wheels, separate means for imparting a return stroke to said carrying device, spring actuated trip mechanism for restoring said returning means to normal position, and means for determining at what point said trip mechanism shall be operated.

180. In an adding device, the combination of a pair of adding wheels; a series of keys; means controlled by said keys for operating one of said wheels; a carrying device for actuating the second of said wheels; and an electrically operated tripping means for imparting a return stroke to said carrying device.

181. In an adding machine, the combination of a series of adding wheels; a series of keys; means controlled by said keys for rotating said wheels; a series of spring actuated carrying levers; a restoring frame common to all of said carrying levers; means for causing said frame to return all of said levers against the tension of their springs; and spring actuated trip mechanism for subsequently returning said restoring frame to normal position.

182. In an adding device, the combination of a pair of adding wheels; a series of keys; means controlled by said keys for rotating one of said wheels; a carrying device adapted to actuate the second of said wheels; an electro-magnet controlling one of the movements of said carrying device; and an electric circuit including a controller operated by said magnet and causing the operation of said wheel rotating means.

183. In an adding device, the combination of a series of adding wheels; a series of keys controlling said wheels; a series of carrying devices for said wheels; a spring return rocker frame common to all of said carrying devices for restoring them to normal position; a hook for actuating said rocker frame; and means for causing said hook to be disengaged from said rocker frame.

184. The combination of a series of keys; a series of adding wheels; means controlled by said keys for operating said wheels differentially to add numbers thereon; carrying devices for said wheels; means for restoring such carrying devices as have been operated; and means operated by said restoring means to bring said operating means into operation.

185. The combination of a frame; a bearing sleeve fixed to said frame; a shaft journaled in said frame and passing through said sleeve; a clutch member fixed to said shaft; an adding wheel journaled on said sleeve so as to be capable of turning thereon and also of sliding axially thereon; a clutch member carried by said wheel and capable of being brought into and out of engagement with the clutch member carried by said shaft by axial movement of the wheel on the sleeve; a rack and pinion arranged to rotate said shaft through differential distances to impart an adding rotation to said adding wheel; and a shifting arm holding the adding wheel clutch member into engagement with the shaft clutch member during the adding rotation of the wheel.

186. The combination of a frame; a bearing sleeve fixed to said frame; a shaft journaled in said frame and passing through said sleeve; a clutch member fixed to said shaft; an adding wheel journaled on said sleeve so as to be capable of turning thereon and also of sliding axially thereon; a clutch member carried by said wheel and capable of being brought into and out of engagement with the clutch member carried by said shaft by axial movement of the wheel on the sleeve; a rack and pinion arranged to rotate said shaft through a definite distance to reset the adding wheels to zero; and a shifting arm tending to press the adding wheel clutch member out of engagement with the shaft clutch member during the resetting rotation of the wheel.

187. The combination of a lever 128, having a segmental rack 129, meshing with and operating a pinion 132, fixed to a shaft 133; a clutch member 135 on said shaft having a clutch tooth 140; a fixed sleeve 134 surrounding said shaft; an adding wheel 138 having a hub journaled on said fixed sleeve; clutch teeth 139 on said hub adapted to mesh with the clutch tooth 140; an annular groove 142 in said hub; and a shifting lever 144 running in said groove and tending to hold the teeth 139 into engagement with the tooth 140 during the turning of said shaft by said segmental rack 129 in the operation of addition.

188. The combination of a lever 128, having a segmental rack 129, meshing with and operating a pinion 132, fixed to a shaft 133; a clutch member 135 on said shaft having a clutch tooth 140; a fixed sleeve 134 surrounding said shaft; an adding wheel 138 having a hub journaled on said fixed sleeve; clutch teeth 139 on said hub adapted to mesh with the clutch tooth 140; an annular groove 142 in said hub; and a shifting lever 144 running in said groove and tending to press the teeth 139 out of engagement with the tooth 140 during the turning of said shaft by said segmental rack 129 in the operation of resetting said wheel to zero.

189. The combination with a type writing machine comprising figure keys and a carriage, of a rotary actuator; and an adding wheel having an axial movement controlled by said carriage to bring it into engagement with said actuator and a rotary movement controlled by said keys.

190. The combination with a plurality of denominational members, of an independently mounted transfer-lever, a transfer-dog mounted on the lever and disposed to engage and operate a denominational member, said transfer-lever engaging and arresting the denominational member thus advanced and remaining in its arresting position during subsequent movement of another denominational member.

191. The combination with a plurality of digit carriers of a transfer-lever coöperatively related to two carriers, and a transfer-dog mounted on said lever to engage and operate one of the carriers, said lever having a locking portion arranged to engage the last named carrier to detain the same during movement of another carrier.

192. In a computing device, the combination with a plurality of denominational members, of arresting members each movable to engage a denominational member and remaining in such engagement during subsequent movement of another denominational member, a transfer-dog mounted on each arresting member to carry a denominational member immediately prior to the arresting thereof, retracting means common to the several arresting members, and a resetting member arranged to operate the retracting means and to reset the denominational members to zero.

193. In a computing device, the combination with a series of denominational wheels, of a series of arresting members each arranged to arrest a wheel, a carrying dog mounted on each arresting member and operated thereby to carry a wheel during the movement of the arresting member, and resetting mechanism operative to first release the wheels from the arresting members and to then reset the same.

194. The combination with a computing device including a pair of denominational members, a driving motor common to both members, transfer mechanism for operating one of the denominational members including a transfer motor, and means controlling the operation of said transfer mechanism and disposed for actuation by the other denominational member.

195. The combination with a computing device including a series of denominational members, a driving motor common to said members, and a series of keys controlling the operations of the motor, of a series of transfer members, each arranged to move a denominational member, a series of transfer motors for operating said members, and means whereby the operation of each transfer member will be controlled by a denominational member other than the one moved by said transfer member.

196. The combination with a series of denominational members, of a master actuator for said members, a series of keys coöperatively related to the actuator to cause varying movements thereof corresponding in extent to the values of the keys, a series of transfer members each arranged to move a denominational member, a separate transfer motor for each transfer member, and means whereby the operation of each transfer member will be controlled by a denominational member other than the one moved by said transfer member.

197. The combination with a series of denominational members and a master actuator therefor, of a driving motor for said actuator, a series of keys controlling the operation of the actuator, and transfer mechanism for the denominational members, including a transfer motor.

198. The combination with a series of denominational members, of transfer mechanism therefor including a transfer motor, means for normally holding the transfer mechanism against effective movement, and a separate motor for operating said holding means to permit the operation of the transfer mechanism under the impulse of the transfer motor.

199. The combination with a series of denominational members, of transfer mechanism therefor including a transfer motor, means for normally holding the transfer mechanism against effective movement, a separate motor for operating said holding means to permit the operation of the transfer mechanism under the impulse of the transfer motor, and keys controlling the operation of the holding means.

200. The combination with a series of denominational members, a series of keys coöperatively related to each member, a series of transfer members, a separate transfer motor for each transfer member, and a series of holding devices for said transfer members, said holding devices being disposed for operation by the denominational members.

201. The combination with a series of denominational members, of a master actuator therefor, a motor for driving the actuator, a series of keys controlling the operation of the motor, a series of transfer members, a series of transfer motors for operating said members, and a series of holding devices for the transfer members, said holding devices being disposed for operation by the denominational members.

202. The combination with a series of denominational members, an actuator therefor, and a series of keys coöperatively related to the actuator, of transfer mechanism for the denominational members, and means controlled by said keys for resetting the transfer mechanism.

203. The combination with a series of denominational members, transfer mechanism therefor, a master actuator common to said members, and key-controlled resetting means for the transfer mechanism.

204. The combination with a series of denominational members, a master actuator therefor, transfer mechanism for the denominational members, resetting means for the transfer mechanism, and a plurality of keys, coöperatively related with the actuator and resetting means respectively.

205. The combination with a series of denominational members, of transfer mechanism therefor including a transfer motor, and key controlled means for resetting the transfer member and restoring the power expended by the transfer motor.

206. The combination with a plurality of denominational members, transfer mechanism therefor including a transfer motor, a series of keys controlling the operation of the denominational members, and means coöperatively related to said keys for resetting the transfer mechanism.

207. The combination with a series of denominational members, of transfer mechanism therefor including a transfer motor, resetting mechanism arranged to reset the transfer mechanism and to restore the energy expended by the transfer motor, a master actuator for the denominational members, and a series of keys coöperatively related with the master actuator and the resetting mechanism respectively.

208. The combination with a series of denominational members, a motor for operating the same, transfer mechanism including a transfer motor, means operated by the denominational members and controlling the operation of the transfer mechanism, a series of keys controlling the operation of the motor, and resetting means for the transfer mechanism, said resetting means being disposed for control by the keys.

209. The combination with a plurality of denominational members, of a master actuator therefor, a driving motor for the actuator, transfer mechanism for the denominational member including a transfer motor, resetting means for the transfer mechanism and keys coöperatively related to both the master actuator and the resetting means.

210. The combination with a series of denominational members and a series of transfer devices therefor, of a resetting lever for said transfer devices, and a key controlling said lever.

211. The combination with a series of denominational members and a series of transfer devices therefor, of a resetting lever for said transfer devices, means for operating said lever, and a plurality of keys controlling said means.

212. In a combined typewriter and adder, the typewriter having a traveling carriage, a receiving mechanism and a setting member for operating it, and a selection device whereby the operator may predetermine whether or not the setting member shall operate the receiving mechanism, said selection device including two coöperating pieces, one stationary and the other traveling relatively thereto, so as to come into contact therewith and pass beyond the same while continuing its travel in the same direction, the traveling piece of the selection device moving in unison with the typewriter carriage, and one of the pieces of the selection device being capable of being set in either active or non-active position.

213. In a combined typewriter and adder, the typewriter having a traveling carriage, a receiving mechanism and a single setting member for operating it in all the ordinal places thereof, and a selecting device whereby the operator may predetermine whether or not the setting member shall operate the receiving mechanism, said selection device including two coöperating pieces, one stationary and the other traveling relatively thereto, so as to come into contact therewith and pass beyond the same while continuing its travel in the same direction, the traveling piece of the selection device moving in unison with the typewriter carriage, and one of the pieces of the selection device being capable of being set in either active or non-active position.

214. In a computing device, the combination with a denominational member, of a transfer member carrying a transfer-dog arranged to engage the denominational member to move the same, another denominational member controlling the movement of the transfer member to cause the transfer-dog to advance the denominational member first named and to present the transfer member in locking engagement with the denominational member advanced thereby and means for holding the transfer member in its locking position during subsequent movement of a denominational member other than the one thus locked.

215. The combination with a plurality of denominational members, of an independently-mounted transfer lever, a transfer-dog mounted on the lever and disposed to engage and operate another denominational member, said transfer-lever being arranged to engage and lock the denominational member thus advanced and to hold the same locked during the subsequent operation of another denominational member.

216. The combination with a plurality of digit-carriers, of a transfer-lever disposed for actuation by one carrier, and a transfer-dog pivotally mounted upon said lever to engage and operate another carrier, said lever being provided with a locking portion arranged to engage the last-named carrier, to lock the same after it has been operated and to hold it locked during the operation of another denominational member.

217. The combination with a series of denominational members and combined transfer and locking members each arranged to move and lock a denominational member and to hold it locked during the actuation of a member of lower order, of means for restoring the transfer members to their normal position.

218. The combination with a series of denominational members and locking means therefor, of resetting mechanism including a resetting-lever, a lever associated with the resetting-lever, and means operated by said associated lever for unlocking the denominational members prior to the resetting thereof.

219. In a computing device, the combination with a series of wheels occupying different denominational positions and carrying means, of means positively operated to lock each wheel against further movement when carried and to hold said wheel locked during the operation of a wheel of lower order.

220. In a computing device, the combination with a series of coaxial wheels occupying different denominational positions and having peripheral teeth, of a locking device brought into operation by one wheel to engage adjacent peripheral teeth of another wheel and lock the latter against movement in either direction.

221. The combination with a series of wheels occupying different denominational positions, of locking devices for the wheels, means whereby one wheel will cause another to advance and a locking device to move into engagement with the advanced wheel, and resetting mechanism including means for moving the locking devices out of engagement with the wheels and for subsequently resetting said wheels.

222. In a computing device, the combination with a plurality of coaxial denominational members, of locking members each movable to engage and lock a denominational member and arranged to hold the same locked during subsequent movement of another denominational member, a pivoted transfer-dog mounted on each locking member and arranged to advance or carry a denominational member immediately prior to the locking thereof, retracting means common to the several locking members, and a resetting member arranged to operate the retracting means and to reset the denominational members to zero.

223. In a computing device, the combination with a series of denominational wheels and a series of transfer members, of a transfer-resetting member common to the several transfer members, a wheel-resetting member, means carried in part by the wheel-resetting member for operating the transfer-resetting member, and means for operating the transfer-resetting member independently of the wheel-resetting member to reset the transfer mechanism.

224. In a computing device, the combination with a series of denominational wheels, of a series of locking members each arranged to engage and lock a wheel against movement in either direction, a carrying-dog mounted on each locking member and operated thereby to carry a wheel during the movement of the locking member into engagement with the wheel, and resetting mechanism arranged to first unlock the wheels and to then reset the same.

Signed at the borough of Manhattan, city of New York, in the county of New York and State of New York, this 15th day of October A. D. 1901.

ALBERT H. ELLIS.

Witnesses:
E. M. WELLS,
K. V. DONOVAN.